United States Patent
Mitsuoka

(10) Patent No.: US 10,625,808 B2
(45) Date of Patent: Apr. 21, 2020

(54) VEHICLE

(71) Applicant: YAMAHA HATSUDOKI KABUSHIKI KAISHA, Iwata-shi, Shizuoka (JP)

(72) Inventor: Ryuta Mitsuoka, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 294 days.

(21) Appl. No.: 15/913,274

(22) Filed: Mar. 6, 2018

(65) Prior Publication Data

US 2018/0257730 A1    Sep. 13, 2018

(30) Foreign Application Priority Data

Mar. 7, 2017   (JP) .................................. 2017-042842

(51) Int. Cl.
*B62K 5/10*    (2013.01)
*B62K 19/20*   (2006.01)
(Continued)

(52) U.S. Cl.
CPC .............. *B62K 5/10* (2013.01); *B62K 5/027* (2013.01); *B62K 5/05* (2013.01); *B62K 5/06* (2013.01);
(Continued)

(58) Field of Classification Search
CPC ... B62K 5/10; B62K 5/27; B62K 5/05; B62K 5/06; B62K 5/08; B62K 19/32;
(Continued)

(56) References Cited

U.S. PATENT DOCUMENTS

| 4,020,914 A * | 5/1977 | Trautwein ............ B60G 21/007 180/210 |
| 4,351,410 A * | 9/1982 | Townsend ................ B62D 9/02 180/210 |

(Continued)

FOREIGN PATENT DOCUMENTS

| CN | 201670311 U | 12/2010 |
| CN | 102092434 B | 7/2014 |

(Continued)

OTHER PUBLICATIONS

Piaggio, Catalogo Parti Di Ricambio, NTRC000U01, MP3 300 ie LT, Mod. ZAPM64102, 116 pages.
(Continued)

*Primary Examiner* — Jacob D Knutson
*Assistant Examiner* — Conan D Duda
(74) *Attorney, Agent, or Firm* — Keating and Bennett, LLP

(57) ABSTRACT

A vehicle includes a body frame including a main frame, a link support, and a connecting bracket that connects a front portion of the main frame and the link support. The connecting bracket includes a turning support that supports a lower cross member, a connector that connects a front portion of the main frame and the link support and a right reinforcement wall and a left reinforcement wall that extend in an up-and-down direction to connect the turning support and the connector. The connecting bracket including the turning support, the connector, the right reinforcement wall, and the left reinforcement wall is monolithic and unitary.

9 Claims, 13 Drawing Sheets

(51) Int. Cl.
*B62K 5/027* (2013.01)
*B62K 5/05* (2013.01)
*B62K 5/06* (2006.01)
*B62K 5/08* (2006.01)
*B62K 25/08* (2006.01)
*B62K 19/32* (2006.01)
*B62K 5/02* (2013.01)
*B62K 5/00* (2013.01)

(52) U.S. Cl.
CPC ............... *B62K 5/08* (2013.01); *B62K 19/20* (2013.01); *B62K 25/08* (2013.01); *B62K 5/02* (2013.01); *B62K 19/32* (2013.01); *B62K 2005/001* (2013.01)

(58) Field of Classification Search
CPC .......... B62K 19/20; B62K 25/08; B62K 5/02; B62K 2005/001
See application file for complete search history.

(56) References Cited

U.S. PATENT DOCUMENTS

| | | | | |
|---|---|---|---|---|
| 4,375,293 | A * | 3/1983 | Solbes | B62B 19/00 280/124.127 |
| 4,469,344 | A * | 9/1984 | Coil | B62K 5/05 280/269 |
| 8,016,302 | B1 * | 9/2011 | Reeve | B62K 5/05 280/124.103 |
| 8,814,186 | B1 * | 8/2014 | Rinda | B62K 5/06 280/93.504 |
| 8,899,600 | B2 * | 12/2014 | Gaillard-Groleas | B60G 99/00 280/124.103 |
| 9,452,806 | B2 * | 9/2016 | Hirayama | B60G 17/005 |
| 2003/0102176 | A1 * | 6/2003 | Bautista | B60G 21/007 180/210 |
| 2006/0151232 | A1 * | 7/2006 | Marcacci | B62K 5/10 180/414 |
| 2006/0255550 | A1 * | 11/2006 | Pfeil | B60G 21/007 280/5.509 |
| 2007/0075514 | A1 * | 4/2007 | Saiki | B60G 7/00 280/124.103 |
| 2007/0075517 | A1 * | 4/2007 | Suhre | B60G 3/20 280/124.134 |
| 2008/0258422 | A1 | 10/2008 | Suzuki | |
| 2009/0084623 | A1 * | 4/2009 | Dagenais | B60T 8/1706 180/210 |
| 2010/0007109 | A1 * | 1/2010 | Mighell | B62K 5/027 280/124.103 |
| 2010/0044977 | A1 * | 2/2010 | Hughes | B60G 21/007 280/5.509 |
| 2010/0127471 | A1 * | 5/2010 | Gazarek | B60G 3/20 280/124.141 |
| 2011/0006498 | A1 * | 1/2011 | Mercier | B62D 9/02 280/124.103 |
| 2011/0215544 | A1 * | 9/2011 | Rhodig | B60G 21/00 280/124.103 |
| 2011/0275256 | A1 * | 11/2011 | Gibbs | B60F 3/0007 440/12.51 |
| 2012/0161410 | A1 * | 6/2012 | Ting | B62K 21/18 280/93.512 |
| 2013/0168934 | A1 * | 7/2013 | Krajekian | B62K 5/027 280/62 |
| 2013/0168944 | A1 * | 7/2013 | Bartolozzi | B62D 9/02 280/269 |
| 2014/0172286 | A1 * | 6/2014 | Moulene | G05D 1/0891 701/124 |
| 2014/0204598 | A1 * | 7/2014 | Di Tanna | B60Q 1/12 362/460 |
| 2014/0238764 | A1 * | 8/2014 | Tsujii | B62M 7/12 180/216 |
| 2014/0346753 | A1 * | 11/2014 | Huang | B62D 9/04 280/269 |
| 2014/0361502 | A1 * | 12/2014 | Kitamura | B62K 5/10 280/5.515 |
| 2014/0375015 | A1 * | 12/2014 | Yu | B62K 5/027 280/267 |
| 2015/0197304 | A1 * | 7/2015 | Kroening, Jr. | B62K 13/04 180/209 |
| 2015/0210338 | A1 * | 7/2015 | Iizuka | B60G 3/01 280/267 |
| 2015/0239522 | A1 * | 8/2015 | Iizuka | B62K 5/027 280/267 |
| 2015/0246704 | A1 * | 9/2015 | Takano | B60G 17/005 280/269 |
| 2015/0251719 | A1 * | 9/2015 | Takano | B60G 3/01 280/267 |
| 2015/0259027 | A1 * | 9/2015 | Takano | B62K 25/08 280/267 |
| 2015/0291241 | A1 * | 10/2015 | Takano | B62K 5/05 280/5.509 |
| 2015/0298736 | A1 * | 10/2015 | Sasaki | B62J 15/00 280/124.103 |
| 2015/0307149 | A1 * | 10/2015 | Iizuka | B62K 19/38 280/267 |
| 2015/0314827 | A1 * | 11/2015 | Takano | B62K 5/05 280/267 |
| 2015/0321721 | A1 * | 11/2015 | Sasaki | B62K 5/08 180/210 |
| 2016/0107713 | A1 * | 4/2016 | Takano | B62K 5/027 180/210 |
| 2016/0114850 | A1 * | 4/2016 | Takano | B62K 11/04 180/210 |
| 2016/0121954 | A1 * | 5/2016 | Sasaki | B62J 17/02 280/269 |
| 2016/0121958 | A1 * | 5/2016 | Asano | B60G 21/026 280/124.103 |
| 2016/0129964 | A1 * | 5/2016 | Takano | B62J 23/00 180/210 |
| 2016/0129967 | A1 * | 5/2016 | Sasaki | B62K 5/08 280/124.103 |
| 2016/0137247 | A1 * | 5/2016 | Sasaki | B62J 15/00 280/124.103 |
| 2016/0137252 | A1 * | 5/2016 | Hirayama | B62K 5/05 280/124.103 |
| 2016/0137253 | A1 * | 5/2016 | Hirayama | B62K 5/05 280/124.103 |
| 2016/0144923 | A1 * | 5/2016 | Asano | B62K 5/05 280/124.103 |
| 2016/0152291 | A1 * | 6/2016 | Sasaki | B62K 5/08 180/210 |
| 2016/0152292 | A1 * | 6/2016 | Takano | B62K 5/08 280/124.103 |
| 2016/0152293 | A1 * | 6/2016 | Hirayama | B62K 5/05 280/124.103 |
| 2016/0185413 | A1 * | 6/2016 | Takano | B62K 5/027 280/124.103 |
| 2016/0229246 | A1 * | 8/2016 | Mori | B60G 3/26 |
| 2016/0229251 | A1 * | 8/2016 | Mori | B62K 5/08 |
| 2016/0229479 | A1 * | 8/2016 | Mori | B62K 5/10 |
| 2016/0229480 | A1 * | 8/2016 | Mori | B62D 9/02 |
| 2016/0251051 | A1 * | 9/2016 | Malphettes | B60G 3/20 280/788 |
| 2016/0280192 | A1 * | 9/2016 | Seto | B60T 8/1706 |
| 2016/0280193 | A1 * | 9/2016 | Seto | B60T 8/1706 |
| 2016/0347295 | A1 * | 12/2016 | Seto | B60T 8/246 |
| 2017/0008591 | A1 * | 1/2017 | Abbott | B62K 5/027 |
| 2017/0088214 | A1 * | 3/2017 | Ohno | B62D 7/16 |
| 2017/0088215 | A1 * | 3/2017 | Ohno | B62K 5/05 |
| 2017/0088216 | A1 * | 3/2017 | Ohno | B60G 17/0155 |
| 2017/0088217 | A1 * | 3/2017 | Ohno | B60G 17/0155 |
| 2017/0088218 | A1 * | 3/2017 | Takano | B62K 25/08 |
| 2017/0088219 | A1 * | 3/2017 | Yoshikuni | B60G 13/003 |
| 2017/0088220 | A1 * | 3/2017 | Hirakawa | B60G 13/005 |
| 2017/0088221 | A1 * | 3/2017 | Ohno | B62K 25/08 |
| 2017/0088222 | A1 * | 3/2017 | Ohno | B62K 21/18 |
| 2017/0088223 | A1 * | 3/2017 | Hirakawa | B60G 21/026 |
| 2017/0088232 | A1 * | 3/2017 | Kaneta | B62L 1/005 |
| 2017/0101150 | A1 * | 4/2017 | Shibuya | B62K 5/027 |
| 2017/0106930 | A1 * | 4/2017 | Hara | B62K 23/02 |

(56) References Cited

U.S. PATENT DOCUMENTS

| | | | |
|---|---|---|---|
| 2017/0106935 A1* | 4/2017 | Hara | B62K 5/027 |
| 2017/0129562 A1* | 5/2017 | Hirakawa | B62J 23/00 |
| 2017/0144719 A1* | 5/2017 | Terada | B62K 3/002 |
| 2017/0203807 A1* | 7/2017 | Hirakawa | B62K 5/05 |
| 2017/0267309 A1* | 9/2017 | Monna | B62K 5/10 |
| 2018/0086168 A1* | 3/2018 | Iguchi | B60G 17/0162 |
| 2018/0086169 A1* | 3/2018 | Iguchi | B60G 17/0162 |
| 2018/0170474 A1* | 6/2018 | Ohno | B62K 5/05 |
| 2018/0215433 A1* | 8/2018 | Raffaelli | B62D 9/02 |
| 2018/0222268 A1* | 8/2018 | Raffaelli | B60G 15/06 |
| 2018/0222527 A1* | 8/2018 | Raffaelli | H02S 50/10 |
| 2018/0229564 A1* | 8/2018 | Mori | B62D 7/14 |
| 2018/0229796 A1* | 8/2018 | Chojecki | B62D 9/02 |
| 2018/0237094 A1* | 8/2018 | Fischer | B62K 5/06 |
| 2018/0257452 A1* | 9/2018 | Mitsuoka | B62K 5/027 |
| 2018/0257706 A1* | 9/2018 | Kanehara | B62K 21/18 |
| 2018/0257728 A1* | 9/2018 | Kanehara | B62K 5/10 |
| 2018/0257729 A1* | 9/2018 | Mitsuoka | B62K 5/05 |
| 2018/0257730 A1* | 9/2018 | Mitsuoka | B62K 5/08 |
| 2018/0257731 A1* | 9/2018 | Kanehara | B62K 5/027 |
| 2018/0265155 A1* | 9/2018 | Raffaelli | B62K 5/027 |
| 2018/0265156 A1* | 9/2018 | Hara | B62D 5/046 |
| 2018/0265157 A1* | 9/2018 | Hara | B62K 25/08 |
| 2018/0265158 A1* | 9/2018 | Hara | B62K 5/027 |
| 2018/0281543 A1* | 10/2018 | Mori | B62K 5/10 |
| 2018/0281546 A1* | 10/2018 | Mori | B62K 5/08 |
| 2018/0281890 A1* | 10/2018 | Mori | B62K 19/32 |
| 2018/0319436 A1* | 11/2018 | Kato | B62K 19/02 |
| 2018/0327044 A1* | 11/2018 | Raffaelli | B62K 5/06 |
| 2018/0346057 A1* | 12/2018 | Mukai | B60G 11/52 |
| 2019/0016405 A1* | 1/2019 | Huang | B62D 9/02 |
| 2019/0023123 A1* | 1/2019 | Laberge | B60K 13/02 |
| 2019/0023264 A1* | 1/2019 | Mizutani | B60T 8/172 |
| 2019/0039668 A1* | 2/2019 | Laberge | B62K 5/05 |
| 2019/0047550 A1* | 2/2019 | Miki | B62K 5/10 |
| 2019/0047652 A1* | 2/2019 | Laberge | B62M 7/02 |
| 2019/0100268 A1* | 4/2019 | Deguchi | B60R 21/16 |
| 2019/0106174 A1* | 4/2019 | Brudeli | B62D 9/02 |
| 2019/0118598 A1* | 4/2019 | Sasaki | B62J 15/00 |
| 2019/0144035 A1* | 5/2019 | Doerksen | B60G 17/018 280/124.103 |
| 2019/0232749 A1* | 8/2019 | Di Tanna | B60G 13/003 |
| 2019/0270490 A1* | 9/2019 | Holroyd | B60K 17/043 |
| 2019/0300095 A1* | 10/2019 | Raffaelli | B62K 5/027 |
| 2019/0344855 A1* | 11/2019 | Raffaelli | B62K 5/10 |
| 2019/0366792 A1* | 12/2019 | Raffaelli | B60G 21/05 |
| 2019/0367125 A1* | 12/2019 | Socci | B62K 25/08 |
| 2019/0375262 A1* | 12/2019 | Raffaelli | B62K 5/10 |
| 2019/0375476 A1* | 12/2019 | Raffaelli | B62K 5/10 |
| 2019/0382068 A1* | 12/2019 | Nagasaka | B62K 5/027 |
| 2019/0382069 A1* | 12/2019 | Nagasaka | B62K 5/08 |
| 2019/0382070 A1* | 12/2019 | Raffaelli | B62K 5/05 |
| 2020/0001942 A1* | 1/2020 | Shibuya | B62K 5/10 |
| 2020/0010116 A1* | 1/2020 | Raffaelli | B62K 5/01 |
| 2020/0017158 A1* | 1/2020 | Hara | B62D 5/0457 |

FOREIGN PATENT DOCUMENTS

| | | |
|---|---|---|
| EP | 1 227 966 B1 | 3/2005 |
| EP | 3 069 979 A2 | 9/2016 |
| JP | 03-013294 U | 2/1991 |

OTHER PUBLICATIONS

Official Communication issued in corresponding European Patent Application No. 18160496.8, dated Apr. 8, 2019.

* cited by examiner

VEHICLE

CROSS REFERENCE TO RELATED APPLICATIONS

This application claims the benefit of priority to Japanese Patent Application No. 2017-042842 filed on Mar. 7, 2017. The entire contents of this application are hereby incorporated herein by reference.

BACKGROUND OF THE INVENTION

1. Field of the Invention

The present invention relates to a vehicle including a body frame that leans and two front wheels that are aligned side by side in a left-and-right direction.

2. Description of the Related Art

Catalogo parti di ricambio, MP3 300 ie LT Mod. ZAPM64102, Piaggio describes a vehicle including a body frame that can lean and a right front wheel and a left front wheel that are aligned side by side in a left and right direction. This vehicle leans to the right of the vehicle when it turns to the right and leans to the left of the vehicle when it turns to the left. This vehicle includes a linkage.

The linkage includes an upper cross member and a lower cross member. The linkage also includes a right side member that is connected to right portions of the upper cross member and the lower cross member, and a left side member that is connected to left portions of the upper cross member and the lower cross member. Middle portions of the upper cross member and the lower cross member are supported on the body frame. The upper cross member and the lower cross member are supported on a link support of the body frame so as to turn about axes that extend substantially in a front-and-rear direction of the body frame.

The upper cross member and the lower cross member turn relative to the body frame as the body frame leans, such that positions of the right front wheel and the left front wheel change relative to each other in an up-and-down direction of the body frame. With the vehicle remaining in an upright state, the upper cross member and the lower cross member are located above the right front wheel and the left front wheel in relation to the up-and-down direction of the body frame.

This linkage supports the right front wheel and the left front wheel so as to move in the up-and-down direction of the body frame. The linkage supports the right front wheel so as to turn about a right steering axis that extends in the up-and-down direction of the body frame and supports the left front wheel so as to turn about a left steering axis that is parallel to the right steering axis.

In vehicles like the one described above, there is a situation where forces different in magnitude are exerted on a right front wheel and a left front wheel. For example, forces different in magnitude are exerted to the right front wheel and the left front wheel in such a situation that the right front wheel enters a pool of water while the left front wheel does not enter the pool of water. Alternatively, forces different in magnitude are exerted to the right front wheel and the left front wheel in such a state that the right front wheel rides over a stone while the left front wheel remains in contact with a flat road surface.

For example, when a frictional force inputted into the right front wheel from a road surface is greater than a frictional force inputted into the left front wheel from a road surface during braking to slow down or stop the vehicle, a clockwise torsional moment is exerted on an upper cross member and a lower cross member when seen from above the vehicle. This torsional moment is transmitted to a link support which supports the upper cross member and the lower cross member.

The link support of the vehicle described in Catalogo parti di ricambio, MP3 300 ie LT Mod. ZAPM64102, Piaggio includes a pipe-shaped main pipe portion and a boss of a frustum of circular cone having an apex portion and a base portion. The cross members are attached rotatably on the apex portion of the boss. The base portion of the boss that is greater in diameter than the apex portion is welded to the main pipe portion.

The twisting of the cross members is transmitted to the main pipe portion by way of the boss. When the twisting of the cross member is transmitted to the main pipe portion, stress is concentrated on a weld where the boss and the main pipe portion are welded together. In the vehicle described in Catalogo parti di ricambio, MP3 300 ie LT Mod. ZAPM64102, Piaggio above, the stress concentrated on the weld between the boss and the main pipe portion is mitigated when compared with a case where a cylindrical boss is used since the base portion is greater in diameter than the apex portion.

The inventor of preferred embodiments of the present invention has discovered that the link support of the vehicle described in Catalogo parti di ricambio, MP3 300 ie LT Mod. ZAPM64102, Piaggio is also enlarged in diameter for welding the base portion which is enlarged in diameter due to the boss having the shape of a frustum of circular cone.

SUMMARY OF THE INVENTION

Preferred embodiments of the present invention provide vehicles which prevent an enlargement in the size thereof.

A vehicle according to a preferred embodiment of the present invention includes a body frame that leans to the right of the vehicle when the vehicle turns to the right and leans to the left of the vehicle when the vehicle turns to the left; a right front wheel that turns about a right steering axis that extends in an up-and-down direction of the body frame; a left front wheel located to the left of the right front wheel in a left-and-right direction of the body frame and that turns about a left steering axis that is parallel to the right steering axis; a right shock absorber supporting the right front wheel at a lower portion thereof and that absorbs a displacement of the right front wheel towards an upper portion thereof in the up-and-down direction of the body frame; a left shock absorber supporting the left front wheel at a lower portion thereof and that absorbs a displacement of the left front wheel towards an upper portion thereof in the up-and-down direction of the body frame; and a linkage supporting the right front wheel and the left front wheel so as to be displaced relative to each other in the up-and-down direction of the body frame; wherein the linkage includes a right side member supporting an upper portion of the right shock absorber so as to turn about the right steering axis; a left side member supporting an upper portion of the left shock absorber so as to turn about the left steering axis; an upper cross member supporting an upper portion of the right side member at a right end portion thereof so as to turn about a right upper axis that extends in a front-and-rear direction of the body frame, supporting an upper portion of the left side member at a left end portion thereof so as to turn about a left upper axis that is parallel to the right upper axis, and supported on the body frame at a middle portion thereof so as to turn about a middle upper axis that is parallel to the right upper axis and the left upper axis; and a lower cross member supporting a lower portion of the right side member at a right end portion thereof so as to turn about a right lower axis that is parallel to the right upper axis, supporting a lower portion of the left side member at a left end portion thereof so as to turn about a left lower axis that is parallel to the left upper axis, and supported on the body frame at a middle portion thereof so as to turn about a middle lower axis that is parallel to the middle upper axis; wherein the body frame includes a main frame extending in at least a front-and-rear direction of the vehicle to support a component that is to be mounted on the vehicle, a link support located ahead of the main frame in relation to the front-and-rear direction of the vehicle to support the upper cross member and the lower cross member so as to turn, and a connecting bracket that connects a front portion of the main frame and the link support; the connecting bracket includes a turning support connected to the link support to support at least one of the upper cross member and the lower cross member so as to turn about the middle upper axis or the middle lower axis; a connector that connects the front portion of the main frame and the link support by at least a portion thereof above or below the turning support in the up-and-down direction of the body frame; and a right reinforcement wall and a left reinforcement wall that are located to the right and left of a center axis of the turning support, respectively, at least portions thereof in the left-and-right direction of the body frame and extend in the up-and-down direction so as to connect the turning support and the connector; and the connecting bracket including the turning support, the connector, the right reinforcement wall, and the left reinforcement wall are monolithic and unitary.

According to a preferred embodiment of the present, the turning support includes the connecting bracket which is monolithic and unitary with the connector that is connected to the main frame. This enables a portion of torsional moment inputted into the turning support to be transmitted to the main frame by way of the connecting bracket. This reduces the torsional moment that is transmitted from the turning support to the link support, such that stress inputted into the weld between the link support and the turning support is reduced.

Further, the turning support, the connector, the right reinforcement wall, and the left reinforcement wall are integrated into the monolithic and unitary element. The torsional moment inputted into the turning support is dispersed not only to the weld between the turning support and the link support but also to the right reinforcement wall and the left reinforcement wall that are located to the right and left of the turning support, respectively, and transmitted to the link support. This reduces the stress that is concentrated on the weld between the turning support and the link support.

Due to the reasons described above, the stress concentrated on the weld between the turning support and the link support is reduced. It is easier to provide a sufficient connecting strength between the turning support and the link support without using the large diameter link support by forming the turning support into the shape of a frustum of circular cone as done in Catalogo parti di ricambio, MP3 300 ie LT Mod. ZAPM64102, Piaggio. This makes it difficult for the link support to be enlarged in diameter, thus preventing and enlargement in the size of the vehicle.

In the vehicle according to a preferred embodiment described above, the turning support supports the lower cross member so as to turn, and the right reinforcement wall and the left reinforcement wall connect the connector that is located below the turning support to the turning support.

In many occasions, a torsional force inputted into the lower cross member is greater than torsional force inputted into the upper cross member. Although a large torsional force is inputted from the lower cross member to the link support, the preferred embodiment described above reduces stress that is inputted into the weld between the link support and the turning support. This prevents an enlargement in the diameter of the lower portion of the link support, thus making it possible to prevent an enlargement in the size of the vehicle.

In the vehicle according to a preferred embodiment described above, a rear portion of the right reinforcement wall and a rear portion of the left reinforcement wall are connected at a rear reinforcement wall.

According to the vehicle of the present preferred embodiment, connecting the rear portion of the right reinforcement wall and the rear portion of the left reinforcement wall by the rear reinforcement wall enhances the strength of the connecting bracket.

In the vehicle according to a preferred embodiment described above, the rear reinforcement wall is monolithic and unitary with the connecting bracket, and a first space that opens forwards is defined by the turning support, the right reinforcement wall, the left reinforcement wall, the rear reinforcement wall and the connector, and a weld between the connecting bracket and the link support surrounds an opening of the first space in such a way that the opening of the first space is closed by the link support.

According to the vehicle of the present preferred embodiment, providing the first space in the interior of the connecting bracket reduces the weight of the connecting bracket. In addition, providing the weld so as to surround the opening portion of the first space ensures a large welding area, thus making it easy to enhance the welding strength between the connecting bracket and the link support.

In the vehicle according to a preferred embodiment above, the lower cross member includes a lower front cross element located ahead of the link support and a lower rear cross element located behind the link support and connected to the lower front cross element, and the turning support supports the lower rear cross element so as to turn about the middle lower axis.

On many occasions, a torsional force inputted into the lower cross member is greater than a torsional force inputted into the upper cross member. Although a large torsional force is inputted from the lower cross member to the link support, the preferred embodiment described above preferably reduces stress that is inputted into the weld between the link support and the turning support. This prevents an enlargement in the diameter of the lower portion of the link support, thus making it possible to prevent an enlargement in the size of the vehicle.

In the vehicle according to a preferred embodiment described above, the main frame includes a right frame extending in at least the front-and-rear of the vehicle; and a left frame extending in at least the front-and-rear direction of the vehicle and located to the left of the right frame in a left-and-right direction of the vehicle, the right reinforcement wall is located to the left of a front end of the right frame in the left-and-right direction of the vehicle, and the left reinforcement wall is located to the right of a front end of the left frame in the left-and-right direction of the vehicle.

According to a preferred embodiment of a vehicle, the right reinforcement wall and the left reinforcement wall are disposed near the upper cross member or the lower cross member while avoiding interference with the upper cross member and the lower cross member, thus making it easy to prevent an enlargement in the size of the vehicle.

In the vehicle according to a preferred embodiment described above, the rear portion of the right reinforcement wall and the rear portion of the left reinforcement wall are connected by the rear reinforcement wall, the connector includes a right wall connecting a front portion of the right frame to the right reinforcement wall; a left wall connecting a front portion of the left frame to the left reinforcement wall; a rear wall connecting the front portion of the right frame to the front portion of the left frame; and a lower wall connecting a lower portion of the right wall, a lower portion of the left wall and a lower portion of the rear wall, or an upper wall connecting an upper portion of the right wall, an upper portion of the left wall, and an upper portion of the rear wall, and a second space that opens upwards or downwards is defined by the rear reinforcement wall, the right wall, the left wall, the rear wall, and the lower wall or the upper wall.

According to the vehicle of the present preferred embodiment, providing the second space in the interior of the connecting bracket reduces the weight of the connecting bracket.

In the vehicle according to a preferred embodiment described above, a front portion of the right wall is located to the left of a rear portion thereof, and a front portion of the left wall is located to the right of a rear portion thereof when the vehicle is seen from above.

According to a preferred embodiment of the vehicle, the right reinforcement wall and the left reinforcement wall are disposed near the cross member while avoiding interference therewith, thus making it easy to prevent an enlargement in the size of the vehicle.

In the vehicle according to a preferred embodiment described above, the right frame preferably includes a right upper frame extending in at least the front-and-rear direction of the vehicle; and a right lower frame located below the right upper frame and extending in the front-and-rear direction of the vehicle, the left frame includes a left upper frame extending in at least the front-and-rear direction of the vehicle; and a left lower frame located below the left upper frame and extending in the front-and-rear direction of the vehicle, a front portion of the right upper frame and a front portion of the left upper frame are connected to an upper portion of the link support via an upper bracket, the upper bracket includes a right upper insertion hole into which the front portion of the right upper frame is inserted and a left upper insertion hole into which a front portion of the left upper frame is inserted, the connecting bracket includes a right lower insertion hole into which a front portion of the right lower frame is inserted and a left lower insertion hole into which a front portion of the left lower frame is inserted, and the upper bracket and the connecting bracket are connected by a right vertical connecting frame extending in the up-and-down direction of the body frame and a left vertical connecting frame extending in the up-and-down direction of the body frame and located to the left of the right vertical connecting frame.

According to a preferred embodiment of the vehicle, the connecting strength of the upper bracket and the connecting bracket is enhanced by the right vertical connecting frame and the left vertical connecting frame, thus making it easy to fix relative positions thereof to the right upper insertion hole, the left upper insertion hole, the right lower insertion hole, and the left lower insertion hole. This enhances the working efficiency when inserting the respective front portions of the frames into the corresponding insertion holes.

The above and other elements, features, steps, characteristics and advantages of the present invention will become more apparent from the following detailed description of the preferred embodiments with reference to the attached drawings.

DETAILED DESCRIPTION OF THE PREFERRED EMBOIDMENTS

Figure 1:
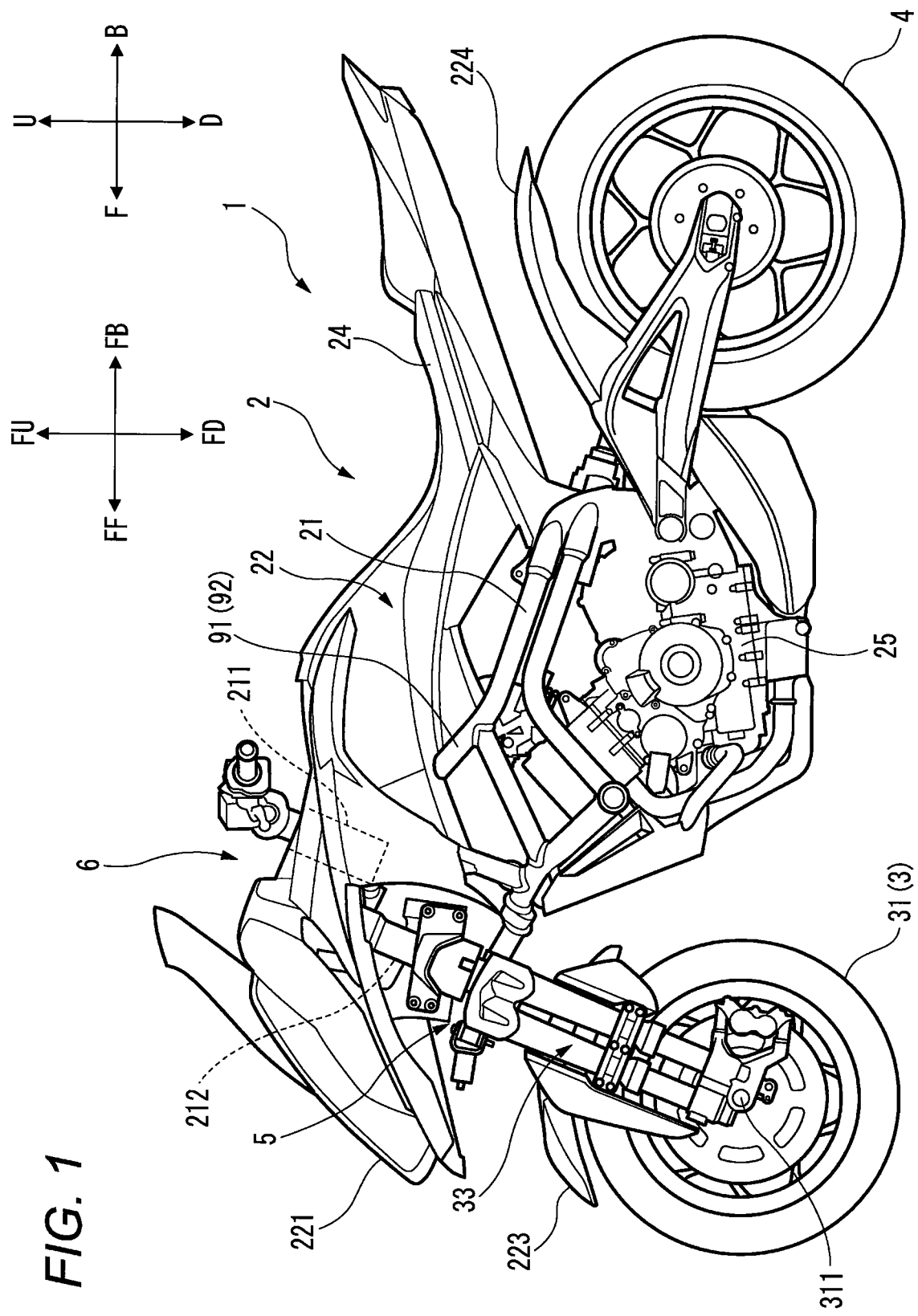
FIG. 1 is a side view showing the a vehicle according to a preferred embodiment of the present invention as seen from a left side thereof.

Referring to the accompanying drawings, preferred embodiments will be described in detail below.

In the accompanying drawings, an arrow F denotes a forward direction of a vehicle. An arrow B denotes a rearward direction of the vehicle. An arrow U denotes an upward direction of the vehicle. An arrow D denotes a downward direction of the vehicle. An arrow R denotes a rightward direction of the vehicle. An arrow L denotes a leftward direction of the vehicle.

A vehicle turns with a body frame being caused to lean to the left or right of the vehicle from a vertical direction. Then, in addition to the directions relative to the vehicle, directions relative to the body frame are defined. In the accompanying drawings, an arrow FF denotes a forward direction of the body frame. An arrow FB denotes a rearward direction of the body frame. An arrow FU denotes an upward direction of the body frame. An arrow FD denotes a downward direction of the body frame. An arrow FR denotes a rightward direction of the body frame. An arrow FL denotes a leftward direction of the body frame.

In this specification, a "front-and-rear direction of the body frame," a "left-and-right direction of the body frame" and an "up-and-down direction of the body frame" include a front-and-rear direction, a left-and-right direction and an up-and-down direction based on the body frame as viewed from a rider who rides the vehicle. A "side of the body frame" includes a right side of the body frame or a left side of the vehicle body.

In this specification, "extending in the front-and-rear direction of the body frame" includes extending in the front-and-rear direction of the body frame while being inclined with respect to the front-and-rear direction of the body frame and includes extending in the front-and-rear direction of the body frame while being inclined more towards the front-to-rear direction than towards the left-to-right direction and the up-to-down direction of the body frame.

In this specification, "extending in the left-and-right direction of the body frame" includes extending in the left-and-right direction of the body frame while being inclined with respect to the left-and-right direction of the body frame and includes extending in the left-and-right direction of the body frame while being inclined more towards the left-and-right direction than towards the front-and-rear direction and the up-and-down direction of the body frame.

In this description, "extending in the up-and-down direction of the body frame" includes extending in the up-and-down direction of the body frame while being inclined with respect to the up-and-down direction of the body frame and includes extending in the up-and-down direction of the body frame while being inclined more towards the up-and-down direction than towards the front-and-rear direction and the left-and-right direction of the body frame.

In this description, an "upright state of the vehicle" or the "vehicle stands upright" includes a state in which the vehicle remains not steered and the up-and-down direction of the body frame coincides with a vertical direction. In this state, the direction of the vehicle coincides with the direction of the body frame. When the vehicle is turning with the body frame caused to lean to the left or right from the vertical direction, the left-and-right direction of the vehicle does not coincide with the left-and-right direction of the body frame. The up-and-down direction of the vehicle does not coincide with the up-and-down direction of the body frame. However, the front-and-rear direction of the vehicle coincides with the front-and-rear direction of the body frame.

In this description, "rotation or rotating" means that a member is displaced at an angle of 360 degrees or more about a center axis thereof. In this description, "turn or turning" means that a member is displaced at an angle of less than 360 degrees about a center axis thereof.

Referring to FIGS. 1 to 7, a vehicle 1 according to a preferred embodiment of the present invention will be described. A vehicle 1 is driven by power generated from a power source and that includes a body frame that leans and two front wheels which are aligned side by side in a left-and-right direction of the body frame.

FIG. 1 is a left side view of the vehicle 1 as viewed from the left thereof. The vehicle 1 includes a vehicle main body 2, a pair of left and right front wheels 3, a rear wheel 4, a linkage 5 and a steering force transmission 6.

The vehicle main body 2 includes a body frame 21, a body cover 22, a seat 24 and an engine 25. In FIG. 1, the vehicle 1 is in an upright state. The following description which will be made with reference to FIG. 1 is based on the premise that the vehicle 1 is standing in the upright state.

The body frame 21 extends in a front-and-rear direction of the vehicle 1. The body frame 21 includes a headpipe 211 (refer to FIG. 4: an example of a rear shaft support) and a link support 212 (refer to FIG. 4: an example of a front shaft support).

The headpipe 211 supports an upstream side steering shaft 60, which will be described below, so as to be turnable. The headpipe 211 extends in an up-and-down direction of the body frame 21. The link support 212 is located ahead of the headpipe 211 in the front-and-rear direction of the vehicle 1. The link support 212 supports the linkage 5 so as to turn.

The body frame 21 supports the engine 25 behind the headpipe 211 in the front-and-rear direction of the vehicle 1. The engine 25 supports the rear wheel 4 so as to swing up and down. The engine 25 includes a power source such as an engine or an electric motor with a battery and a device such as a transmission. The power source generates a force to drive the vehicle 1.

The body cover 22 includes a front cover 221, a pair of left and right front fenders 223 and a rear fender 224. The body cover 22 covers at least a portion of body elements which are mounted on the vehicle 1 such as the pair of left and right front wheels 3, the body frame 21, the linkage 5 and the like.

The front cover 221 is disposed ahead of the seat 24. The front cover 221 covers the linkage 5 and at least a portion of the steering force transmission 6.

At least portions of the pair of left and right front fenders 223 are both disposed directly below the front cover 221. At least portions of the pair of left and right front fenders 223 are disposed directly above the pair of left and right front wheels 3, respectively.

At least a portion of the rear fender 224 is disposed directly above the rear wheel 4.

At least portions of the pair of left and right front wheels 3 are disposed directly below the front cover 221.

At least a portion of the rear wheel 4 is disposed below the seat 24. At least a portion of the rear wheel 4 is disposed directly below the rear fender 224.

Figure 2:
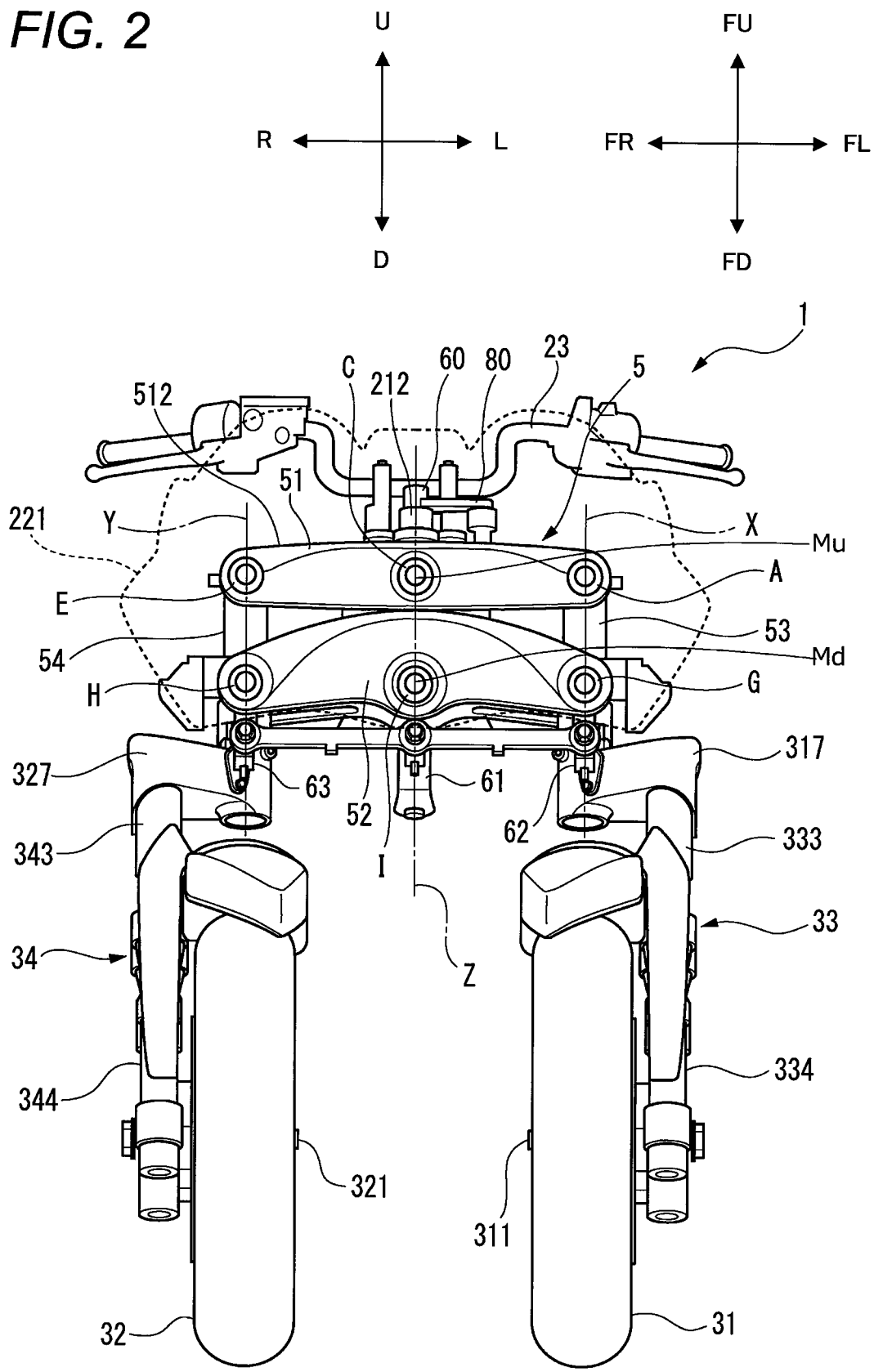
FIG. 2 is a front view showing a front portion of the vehicle shown in FIG. 1.

FIG. 2 is a front view of the front portion of the vehicle 1 as viewed from the front of the body frame 21. In FIG. 2, the vehicle 1 is standing in the upright state. The following description which will be made with reference to FIG. 2 is based on the premise that the vehicle 1 is standing in the upright state. FIG. 2 shows the front portion of the vehicle 1 as seen through the front cover 221 that is indicated by dashed lines.

The pair of left and right front wheels 3 include a left front wheel 31 and a right front wheel 32. The left front wheel 31 and the right front wheel 32 are aligned side by side in a left-and-right direction of the body frame 21. The right front wheel 32 is located to the right of the left front wheel 31 on the body frame 21.

The vehicle 1 includes a left shock absorber 33, a right shock absorber 34, a left bracket 317 and a right bracket 327.

Figure 3:
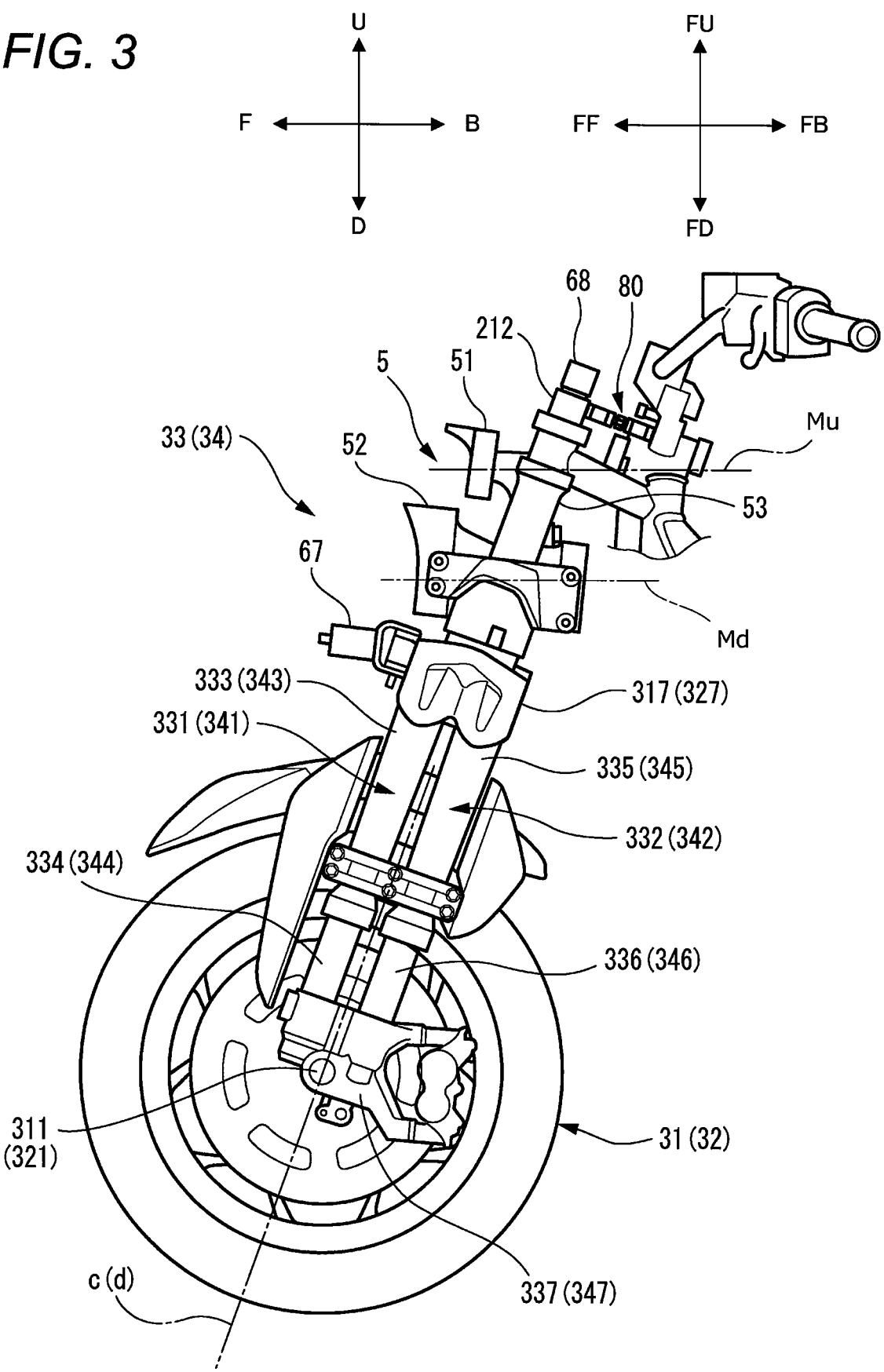
FIG. 3 is a side view showing a left shock absorber and a left front wheel.

FIG. 3 is a side view showing the left shock absorber 33 and the left front wheel 31. The right shock absorber 34 and the left shock absorber 33 are laterally symmetrical with each other, and therefore, reference numerals denoting the right shock absorber 34 are also shown in FIG. 3. As shown in FIG. 3, the left shock absorber 33 is preferably a so-called telescopic shock absorber. The left shock absorber 33 includes a left front telescopic element 331, a left rear telescopic element 332 and a left inner connector 337.

The left front telescopic element 331 includes a left front outer tube 333 and a left front inner tube 334. A lower portion of the left front inner tube 334 is connected to the left inner connector 337. An upper portion of the left front inner tube 334 is inserted into the left front outer tube 333. An upper portion of the left front outer tube 333 is connected to the left bracket 317. The left front inner tube 334 is displaced relative to the left front outer tube 333 along a left extension and contraction axis c that extends in the up-and-down direction of the body frame 21. The left front telescopic element 331 extends and contracts in the direction of the left extension and contraction axis c as a result of the left front inner tube 334 being displaced relative to the left front outer tube 333 along the left extension and contraction axis c.

At least a portion of the left rear telescopic element 332 is located behind the left front telescopic element 331. The left rear telescopic element 332 includes a left rear outer tube 335 and a left rear inner tube 336. The left rear outer tube 335 and the left front outer tube 333 are connected together so as not to move. A lower portion of the left rear inner tube 336 is connected to the left inner connector 337. An upper portion of the left rear inner tube 336 is inserted into the left rear outer tube 335. An upper portion of the left rear outer tube 335 is connected to the left bracket 317. The left rear inner tube 336 is displaced relative to the left rear outer tube 335 along the left extension and contraction axis c that extends in the up-and-down direction of the body frame 21. The left rear telescopic element 332 extends and contracts in the direction of the left extension and contraction axis c as a result of the left rear inner tube 336 being displaced relative to the left rear outer tube 335 along the left extension and contraction axis c.

The left inner connector 337 rotatably supports a left axle member 311 of the left front wheel 31. The left inner connector 337 connects a lower portion of the left front inner tube 334 and a lower portion of the left rear inner tube 336 together.

The left shock absorber 33 attenuates or absorbs a displacement of the left front wheel 31 relative to the left front outer tube 333 and the left rear outer tube 335 along the left extension and contraction axis c by an extending or contracting action of the left front telescopic element 331 and an extending or contracting action of the left rear telescopic element 332.

As shown in FIG. 3, the right shock absorber 34 is preferably a so-called telescopic shock absorber. The right shock absorber 34 includes a right front telescopic element 341, a right rear telescopic element 342 and a right inner connector 347.

The right front telescopic element 341 includes a right front outer tube 343 and a right front inner tube 344. A lower portion of the right front inner tube 344 is connected to the right inner connector 347. An upper portion of the right front inner tube 344 is inserted into the right front outer tube 343. An upper portion of the right front outer tube 343 is connected to the right bracket 327. The right front inner tube 344 is displaced relative to the right front outer tube 343 along a right extension and contraction axis d that extends in the up-and-down direction of the body frame 21. The right front telescopic element 341 extends and contracts in the direction of the right extension and contraction axis d as a result of the right front inner tube 344 being displaced relative to the right front outer tube 343 along the right extension and contraction axis d.

At least a portion of the right rear telescopic element 342 is located behind the right front telescopic element 341. The right rear telescopic element 342 includes a right rear outer tube 345 and a right rear inner tube 346. The right rear outer tube 345 and the right front outer tube 343 are connected together so as not to move. A lower portion of the right rear inner tube 346 is connected to the right inner connector 347. An upper portion of the right rear inner tube 346 is inserted into the right rear outer tube 345. An upper portion of the right rear outer tube 345 is connected to the right bracket 327. The right rear inner tube 346 is displaced relative to the right rear outer tube 345 along the right extension and contraction axis d that extends in the up-and-down direction of the body frame 21. The right rear telescopic element 342 extends and contracts in the direction of the right extension and contraction axis d as a result of the right rear inner tube 346 being displaced relative to the right rear outer tube 345 along the right extension and contraction axis d.

The right inner connector 347 rotatably supports a right axle member 321 of the right front wheel 32. The right inner connector 347 connects a lower portion of the right front inner tube 344 and a lower portion of the right rear inner tube 346 together.

The right shock absorber 34 attenuates or absorbs the displacement of the right front wheel 32 relative to the right front outer tube 343 and the right rear outer tube 345 along the right extension and contraction axis d by an extending or contracting action of the right front telescopic element 341 and an extending or contracting action of the right rear telescopic element 342.

Figure 4:
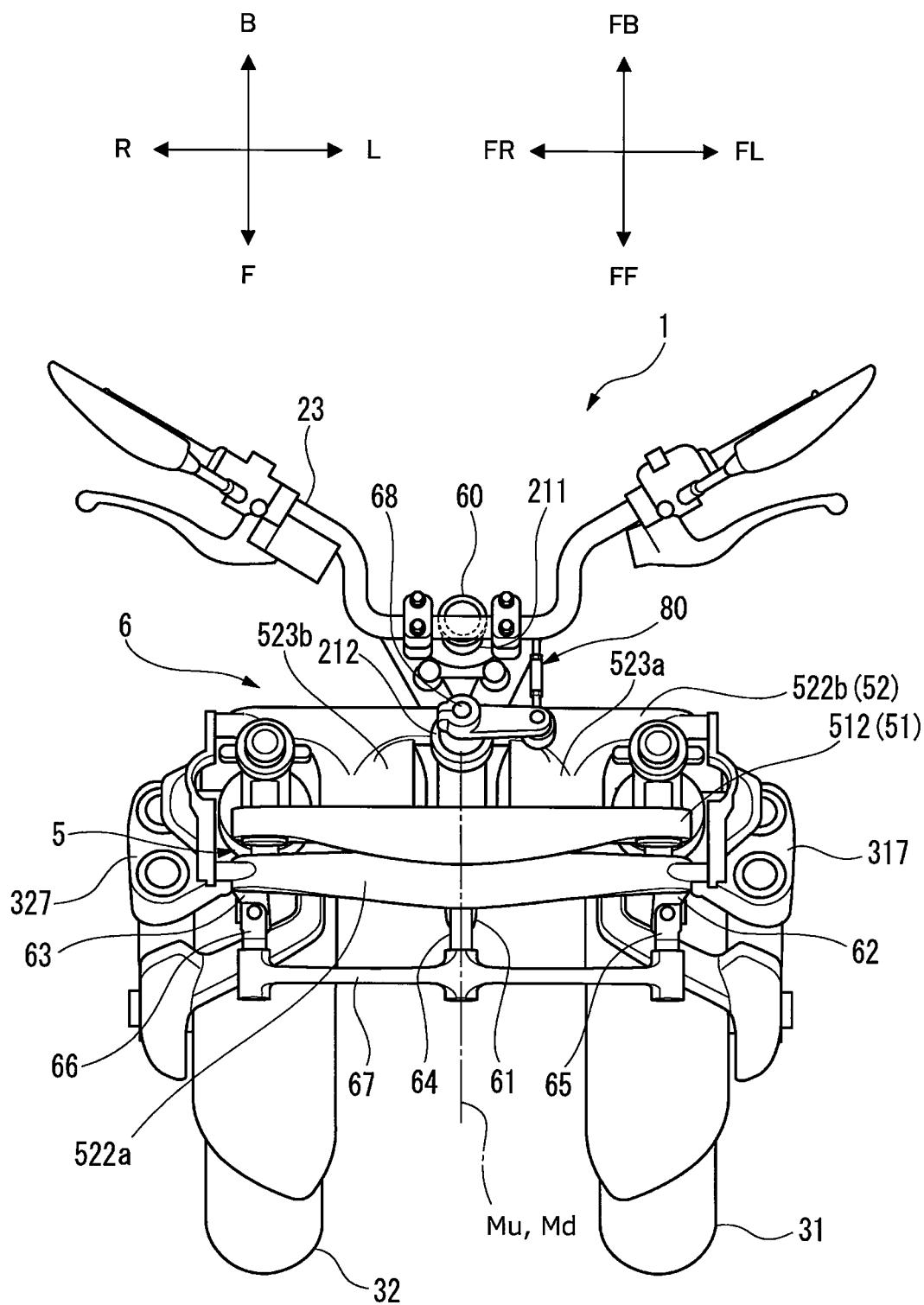
FIG. 4 is a plan view showing the front portion of the vehicle shown in FIG. 1.

As shown in FIG. 4, the vehicle 1 includes the steering force transmission 6. The steering force transmission 6 includes a handlebar 23 (an example of a steering force input), the upstream side steering shaft 60 (an example of a rear shaft member), a connector 80, and a downstream side steering shaft 68 (an example of a front shaft member).

The body frame 21 includes the headpipe 211 that supports the upstream side steering shaft 60 so as to turn and the link support 212 that supports the downstream side steering shaft 68 so as to turn. As shown in FIG. 2, the link support 212 extends in the direction of a middle steering axis Z that extends in the up-and-down direction of the body frame 21. In this preferred embodiment, a turning center (a central steering axis) of the handlebar 23 coincides with a turning center (a rear axis) of the upstream side steering shaft.

A steering force is inputted into the handlebar 23. The upstream side steering shaft 60 is connected to the handlebar 23. An upper portion of the upstream side steering shaft 60 is situated behind a lower portion of the upstream side steering shaft 60 in a front-and-rear direction of the body frame 21. The upstream side steering shaft 60 is supported in the headpipe 211 so as to turn therein.

The connector 80 connects the upstream side steering shaft 60 and the downstream side steering shaft 68. The connector 80 is displaced as the upstream side steering shaft 60 turns. The connector 80 transmits the turning of the upstream side steering shaft 60 to the downstream side steering shaft 68.

The downstream side steering shaft 68 is supported in the link support 212 so as to turn therein. The downstream side steering shaft 68 is connected to the connector 80. The downstream side steering shaft 68 is located ahead of the upstream side steering shaft 60 in the front-and-rear direction of the body frame 21. The downstream side steering shaft 68 turns as the connector 80 is displaced. As a result of the downstream side steering shaft 68 turning, the left front wheel 31 and the right front wheel 32 are steered or turned via a tie-rod 67.

The steering force transmission 6 transmits a steering force exerted on a handlebar 23 by the rider when operating the handlebar 23 to the left bracket 317 and the right bracket 327. A specific configuration will be described in detail below.

In the vehicle 1 according to this preferred embodiment, the linkage 5 preferably uses a four parallel joint link system (also referred to as a parallelogram link).

As shown in FIG. 2, the linkage 5 is disposed above the left front wheel 31 and the right front wheel 32. The linkage 5 includes an upper cross member 51, a lower cross member 52, a left side member 53 and a right side member 54. The linkage 5 is supported so as to turn by the link support 212 that extends in the direction of the middle steering axis Z. Even though the upstream side steering shaft 60 is turned as a result of the operation of the handlebar 23, the linkage 5 is prevented from following the rotation of the upstream side steering shaft 60 and hence does not turn.

The upper cross member 51 includes a plate member 512. The plate member 512 is disposed ahead of the link support 212. The plate member 512 extends in a left-and-right direction of the body frame 21.

A middle portion of the upper cross member 51 is connected to the link support 212 by a connector C. The upper cross member 51 turns relative to the link support 212 about a middle upper axis Mu that passes through the connector C to extend in the front-and-rear direction of the body frame 21.

A left end portion of the upper cross member 51 is connected to the left side member 53 by a connector A. The upper cross member 51 turns relative to the left side member 53 about a left upper axis which passes through the connector A to extend in the front-and-rear direction of the body frame 21.

A right end portion of the upper cross member 51 is connected to the right side member 54 by a connector E. The upper cross member 51 turns relative to the right side member 54 about a right upper axis that passes through the connector E to extend in the front-and-rear direction of the body frame 21.

FIG. 4 is a plan view of the front portion of the vehicle 1 as seen from above the body frame 21. In FIG. 4, the vehicle 1 is standing in the upright state. The following description which will be made with reference to FIG. 4 is based on the premise that the vehicle 1 is standing in the upright state.

As shown in FIG. 4, the lower cross member 52 includes a lower front cross element 522a and a lower rear cross element 522b. The lower front cross element 522a is disposed ahead of the link support 212. The lower rear cross element 522b is disposed behind the link support 212. The lower front cross element 522a and the lower rear cross member 522b extend in the left-and-right direction of the body frame 21. The lower front cross element 522a and the lower rear cross member 522b are connected together by a left connecting block 523a and a right connecting block 532b. The left connecting block 523a is disposed to the left of the link support 212. The right connecting block 523b is disposed to the right of the link support 212.

Returning to FIG. 2, the lower cross member 52 is disposed below the upper cross member 51. The lower cross member 52 extends parallel to the upper cross member 51. A middle portion of the lower cross member 52 is connected to the link support 212 by a connector I. The lower cross member 52 turns about a middle down or lower axis Md that passes through the connector I to extend in the front-and-rear direction of the body frame 21.

A left end portion of the lower cross member 52 is connected to the left side member 53 by a connector G. The lower cross member 52 turns about a left lower axis which passes through the connector G to extend in the front-and-rear direction of the body frame 21.

A right end portion of the lower cross member 52 is connected to the right side member 54 by a connector H. The lower cross member 52 turns about a right lower axis which passes through the connector H to extend in the front-and-rear direction of the body frame 21. A length of the upper cross member 51 from the connector E to the connector A is equal or substantially equal to a length of the lower cross member from the connector H to the connector G.

The middle upper axis Mu, the right upper axis, the left upper axis, the middle lower axis Md, the right lower axis, and the left lower axis extend parallel to one another. The middle upper axis Mu, the right upper axis, the left upper axis, the middle lower axis Md, the right lower axis, and the left lower axis are disposed above the left front wheel 31 and the right front wheel 32.

As shown in FIGS. 2 and 4, the left side member 53 is disposed to the left of the link support 212. The left side member 53 is disposed above the left front wheel 31. The left side member 53 extends parallel to the middle steering axis Z of the link support 212. An upper portion of the left side member 53 is disposed behind a lower portion thereof.

A lower portion of the left side member 53 is connected to the left bracket 317. The left bracket 317 turns about a left steering axis X relative to the left side member 53. The left steering axis X extends parallel to the middle steering axis Z of the link support 212.

As shown in FIGS. 2 and 4, the right side member 54 is disposed to the right of the link support 212. The right side member 54 is disposed above the right front wheel 32. The right side member 54 extends parallel to the middle steering axis Z of the link support 212. An upper portion of the right side member 54 is disposed behind a lower portion thereof.

A lower portion of the right side member 54 is connected to the right bracket 327. The right bracket 327 turns about a right steering axis Y relative to the right side member 54. The right steering axis Y extends parallel to the middle steering axis Z of the link support 212.

Thus, as has been described above, the upper cross member 51, the lower cross member 52, the left side member 53, and the right side member 54 are supported by the link support 212 so that the upper cross member 51 and the lower cross member 52 are held in postures which are parallel to each other and so that the left side member 53 and the right side member 54 are held in postures which are parallel to each other.

As shown in FIGS. 2 and 4, the steering force transmission 6 includes a middle transmission plate 61, a left transmission plate 62, a right transmission plate 63, a middle joint 64, a left joint 65, a right joint 66, and the tie-rod 67.

The middle transmission plate 61 is connected to a lower portion of the downstream side steering shaft 68. The middle transmission plate 61 cannot turn relative to the downstream side steering shaft 68. The middle transmission plate 61 turns about the middle steering axis Z relative to the link support 212.

The left transmission plate 62 is disposed to the left of the middle transmission plate 61. The left transmission plate 62 is connected to the left bracket 317. The left transmission plate 62 cannot turn relative to the left bracket 317. The left transmission plate 62 turns about the left steering axis X relative to the left side member 53.

The right transmission plate 63 is disposed to the right of the middle transmission plate 61. The right transmission plate 63 is connected to the right bracket 327. The right transmission plate 63 cannot turn relative to the right bracket 327. The right transmission plate 63 turns about the right steering axis Y relative to the right side member 54.

As shown in FIG. 4, the middle joint 64 is connected to a front portion of the middle transmission plate 61 via a shaft that extends in the up-and-down direction of the body frame 21. The middle transmission plate 61 and the middle joint 64 are able to turn relative to each other about this shaft.

The left joint 65 is disposed to the left of the middle joint 64. The left joint 65 is connected to a front portion of the left transmission plate 62 via a shaft that extends in the up-and-down direction of the body frame. The left transmission plate 62 and the left joint 65 are able to turn relative to each other about this shaft.

The right joint 66 is disposed to the right of middle joint 64. The right joint 66 is connected to a front portion of the right transmission plate 63 via a shaft that extends in the up-and-down direction of the body frame. The right transmission plate 63 and the right joint 66 are able to turn relative to each other about this shaft portion.

A shaft that extends in the front-and-rear direction of the body frame 21 is provided at a front portion of the middle joint 64. A shaft that extends in the front-and-rear direction of the body frame 21 is provided at a front portion of the left joint 65. A shaft that extends in the front-and-rear direction of the body frame 21 is provided at a front portion of the right joint 66.

The tie-rod 67 extends in the left-and-right direction of the body frame 21. The tie-rod 67 is connected to the middle joint 64, the left joint 65, and the right joint 66 via these shafts. The tie-rod 67 and the middle joint 64 turn relative to each other about the shaft portion that is provided at the front portion of the middle joint 64. The tie-rod 67 and the left joint 65 turn relative to each other about the shaft that is provided at the front portion of the left joint 65. The tie rod 67 and the right joint 66 turn relative to each other about the shaft that is provided at the front portion of the right joint 66.

Figure 5:
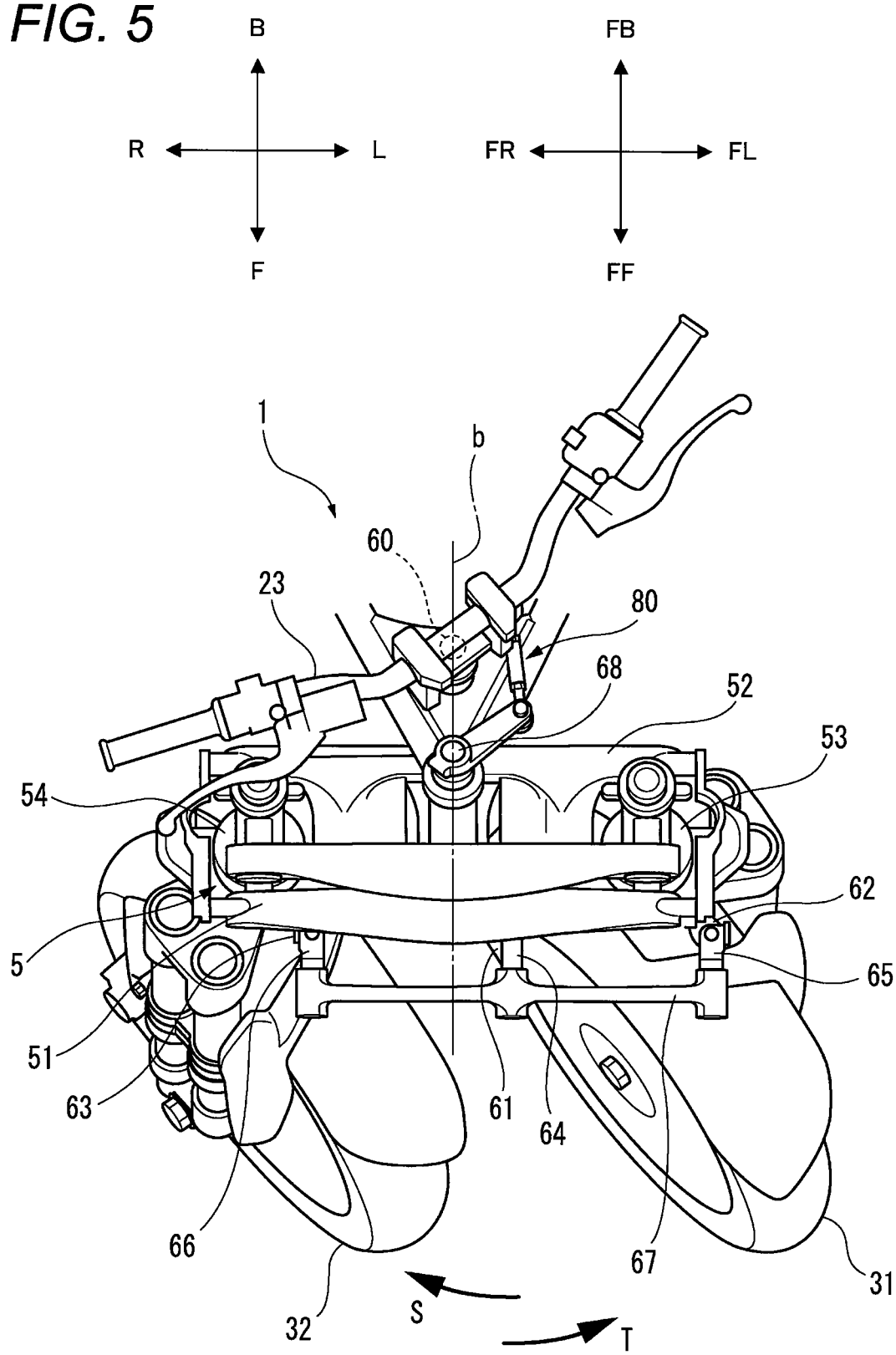
FIG. 5 is a plan view showing the front portion of the vehicle shown in FIG. 1 when the vehicle is steered.

Next, referring to FIGS. 4 and 5, a steering operation of the vehicle 1 will be described. FIG. 5 is a plan view, as seen from above the body frame 21, of the front portion of the vehicle 1 with the left front wheel 31 and the right front wheel 32 turned to the left.

When the rider operates the handlebar 23, the upstream side steering shaft 60 turns. The turning motion of the upstream side steering shaft 60 is transmitted to the downstream side steering shaft 68 via the connector 80. The downstream side steering shaft 68 turns relative to the link support 212 about a front steering axis b. In the case of the left front wheel 31 and the right front wheel 32 being turned to the left as shown in FIG. 5, as the handlebar 23 is operated, the middle transmission plate 61 turns relative to the link support 212 in a direction indicated by an arrow T about the front steering axis b.

In association with the turning of the middle transmission plate 61 in the direction indicated by the arrow T, the middle joint 64 of the tie-rod 67 turns relative to the middle transmission plate 61 in a direction indicated by an arrow S. This moves the tie-rod 67 left rear with its posture kept unchanged.

As the tie-rod 67 moves to the left and rear, the left joint 65 and the right joint 66 of the tie-rod 67 turn in the direction indicated by the arrow S relative to the left transmission plate 62 and the right transmission plate 63, respectively. This causes the left transmission plate 62 and the right transmission plate 63 to turn in the direction indicated by the arrow T with the tie-rod 67 maintaining its posture unchanged.

When the left transmission plate 62 turns in the direction indicated by the arrow T, the left bracket 317, which cannot turn relative to the left transmission plate 62, turns in the direction indicated by the arrow T about the left steering axis X relative to the left side member 53.

When the right transmission plate 63 turns in the direction indicated by the arrow T, the right bracket 327, which cannot turn relative to the right transmission plate 63, turns in the direction indicated by the arrow T about the right steering axis Y relative to the right side member 54.

When the left bracket 317 turns in the direction indicated by the arrow T, the left shock absorber 33, which is connected to the left bracket 317 via the left front outer tube 333 and the left rear outer tube 335, turns in the direction indicated by the arrow T about the left steering axis X relative to the left side member 53. When the left shock absorber 33 turns in the direction indicated by the arrow T, the left front wheel 31, which is supported on the left shock absorber 33, turns in the direction indicated by the arrow T about the left steering axis X relative to the left side member 53.

When the right bracket 327 turns in the direction indicated by the arrow T, the right shock absorber 34, which is connected to the right bracket 327 via the right front outer tube 343 and the right rear outer tube 345, turns in the direction indicated by the arrow T about the right steering axis Y relative to the right side member 54. When the right shock absorber 34 turns in the direction indicated by the arrow T, the right front wheel 32, which is supported on the right shock absorber 34, turns in the direction indicated by the arrow T about the right steering axis Y relative to the right side member 54.

When the rider operates the handlebar 23 so as to turn the left front wheel 31 and the right front wheel 32 to the right, the elements described above turn in the direction indicated by the arrow S. Since the elements move the other way around in relation to the left-and-right direction, detailed description thereof will be omitted here.

Thus, as has been described heretofore, as the rider operates the handlebar 23, the steering force transmission 6 transmits the steering force accordingly to the left front wheel 31 and the right front wheel 32. The left front wheel 31 and the right front wheel 32 turn about the left steering axis X and the right steering axis Y, respectively, in the direction corresponding to the direction in which the handlebar 23 is operated by the rider.

Figure 6:
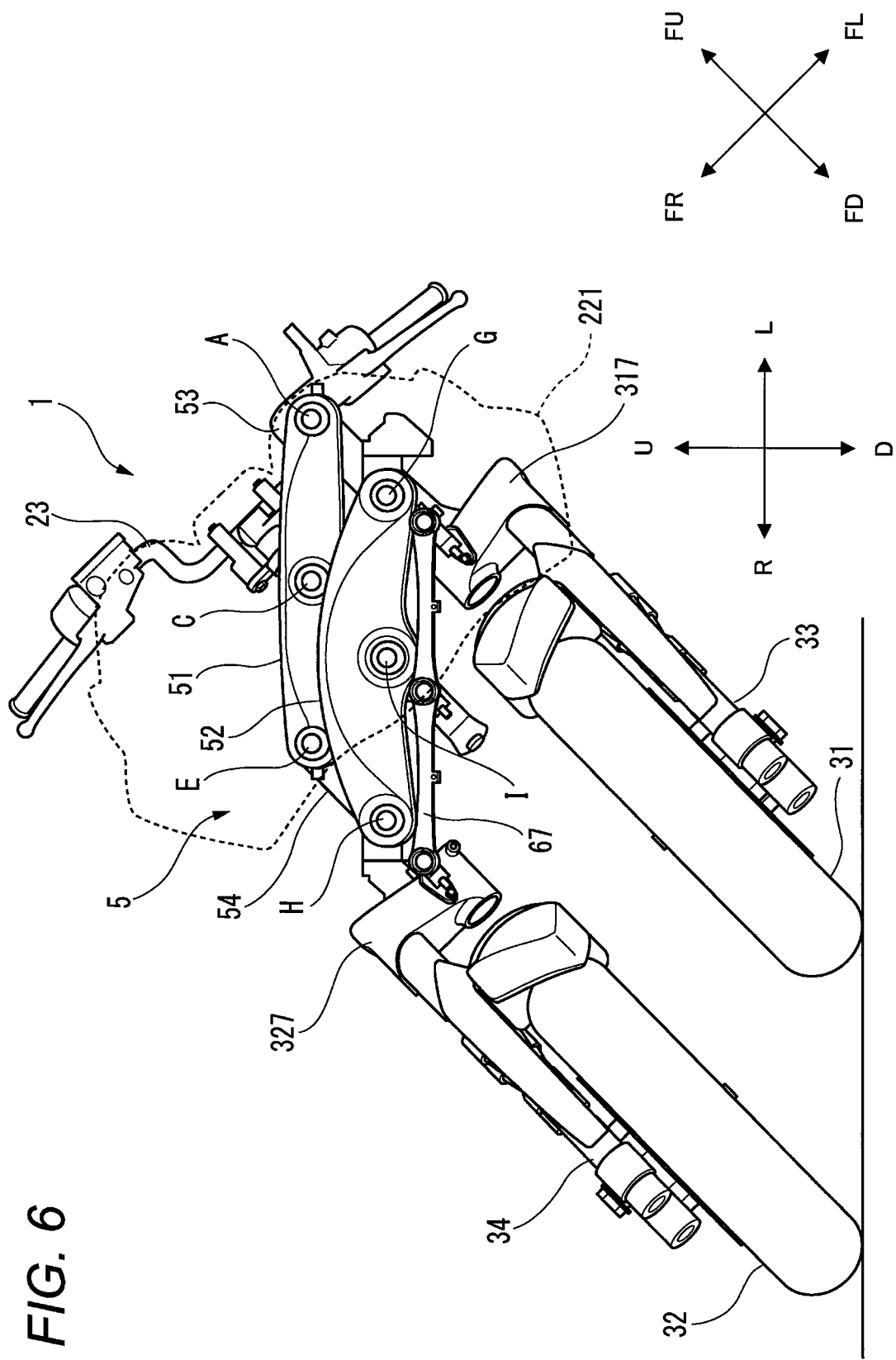
FIG. 6 is a front view showing the front portion of the vehicle shown in FIG. 1 when the vehicle is caused to lean.

Next, referring to FIGS. 2 and 6, a leaning operation of the vehicle 1 will be described. FIG. 6 is a front view of the front portion of the vehicle 1 as viewed from the front of the body frame 21, showing a state where the body frame 21 leans to the left of the vehicle 1. FIG. 6 shows a state in which the front portion of the vehicle 1 is seen through the front cover 221 which is indicated by dashed lines.

As shown in FIG. 2, with the vehicle 1 standing in the upright state, when looking at the vehicle 1 from the front of the body frame 21, the linkage 5 has a rectangular or substantially rectangular shape. As shown in FIG. 6, with the vehicle 1 leaning to the left, when looking at the vehicle 1 from the front of the body frame 21, the linkage 5 has a parallelogram shape. The deformation of the linkage 5 is associated with the leaning of the body frame 21 in the left-and-right direction of the vehicle 1. The operation of the linkage 5 means that the upper cross member 51, the lower cross member 52, the left side member 53 and the right side member 54 that define the linkage 5 turn relatively about turning axes which pass through the corresponding connectors A, C, E, G, H, I, such that the shape of the linkage 5 changes.

For example, as shown in FIG. 6, when the rider causes the vehicle 1 to lean to the left, the link support 212 leans to the left from the vertical direction. When the link support 212 leans, the upper cross member 51 turns counterclockwise as seen from the front of the vehicle 1 about the middle upper axis Mu that passes through the connector C relative to the link support 212. Similarly, the lower cross member 52 turns counterclockwise as seen from the front of the vehicle 1 about the middle lower axis Md that passes through the connector I relative to the link support 212. This causes the upper cross member 51 to move to the left relative to the lower cross member 52.

As the upper cross member 51 moves to the left, the upper cross member 51 turns counterclockwise as seen from the front of the vehicle 1 about the left upper axis that passes through the connector A and the right upper axis that passes through the connector E relative to the left side member 53 and the right side member 54, respectively. Similarly, the lower cross member 52 turns counterclockwise as seen from the front of the vehicle 1 about the left lower axis that passes through the connector G and the right lower axis that passes through the connector H relative to the left side member 53 and the right side member 54, respectively. This causes the left side member 53 and the right side member 54 to lean to the left from the vertical direction with their postures kept parallel to the link support 212.

As this occurs, the lower cross member 52 moves to the left relative to the tie-rod 67. As the lower cross member 52 moves to the left, the shaft portions that are provided at the respective front portions of the middle joint 64, the left joint 65, and the right joint 66 turn relative to the-tie rod 67. This allows the tie-rod 67 to hold a parallel posture to the upper cross member 51 and the lower cross member 52.

As the left side member 53 leans to the left, the left bracket 317, which is connected to the left side member 53, leans to the left. As the left bracket 317 leans to the left, the left shock absorber 33, which is connected to the left bracket 317, leans to the left. As the left shock absorber 33 leans to the left, the left front wheel 31, which is supported on the left shock absorber 33, leans to the left with its posture kept parallel to the link support 212.

As the right side member 54 leans to the left, the right bracket 327, which is connected to the right side member 54, leans to the left. As the right bracket 327 leans to the left, the right shock absorber 34, which is connected to the right bracket 327, leans to the left. As the right shock absorber 34 leans to the left, the right front wheel 32, which is supported on the right shock absorber 34, leans to the left with its posture kept parallel to the link support 212.

The leaning operations of the left front wheel 31 and the right front wheel 32 are described based on the vertical direction. However, when the vehicle 1 leans (when the linkage 5 is activated to operate), the up-and-down direction of the body frame 21 does not coincide with the vertical up-and-down direction. In a case where the leaning operations are described based on the up-and-down direction of the body frame 21, when the linkage 5 is activated to operate, the relative positions of the left front wheel 31 and the right front wheel 32 to the body frame 21 change. In other words, the linkage 5 changes the relative positions of the left front wheel 31 and the right front wheel 32 to the body frame 21 in the up-and-down direction of the body frame 21 to cause the body frame 21 to lean relative to the vertical direction.

When the rider causes the vehicle 1 to lean to the right, the elements lean to the right. Since the elements move the other way around in relation to the left-and-right direction, the detailed description thereof will be omitted here.

Figure 7:
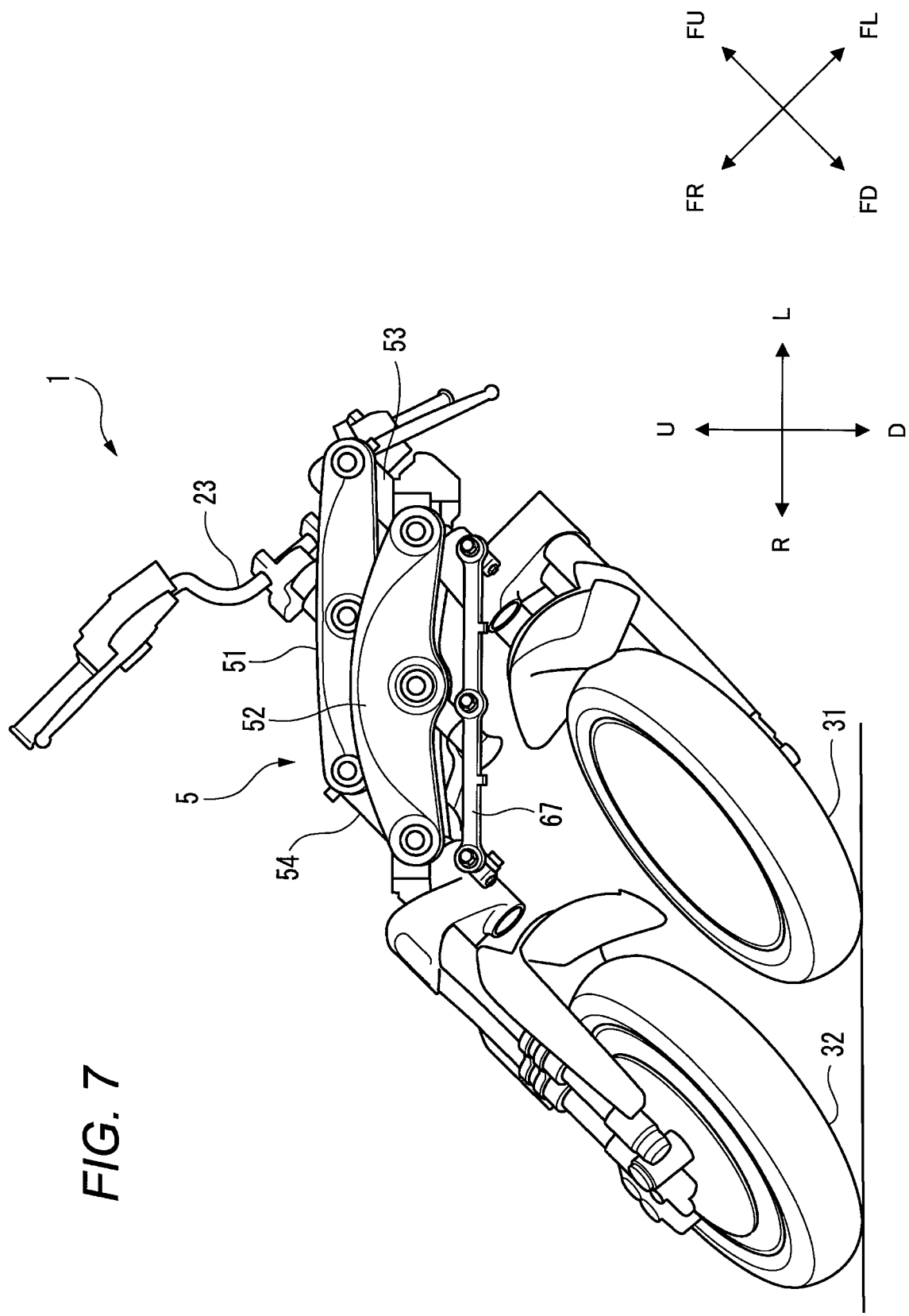
FIG. 7 is a front view showing the front portion of the vehicle shown in FIG. 1 when the vehicle is caused to lean while being steered.

FIG. 7 is a front view of the front portion of the vehicle with the vehicle 1 leaning and being steered. FIG. 7 shows a state in which the vehicle 1 is steered to the left while being caused to lean to the left. The steering operation turns the left front wheel 31 and the right front wheel 32 to the left, and the leaning operation causes the left front wheel 31 and the right front wheel 32 to lean to the left together with the body frame 21. Namely, in this state, the linkage 5 exhibits the parallelogram shape, and the tie-rod 67 moves towards the left rear of the body frame 21 from its position that the tie-rod 67 takes when the body frame 21 stays in the upright state.

Thus, as has been described heretofore, the vehicle 1 of this preferred embodiment includes the body frame 21 that leans to the right of the vehicle 1 when the vehicle 1 turns right and leans to the left of the vehicle 1 when the vehicle 1 turns left; the right front wheel 32 that turns about the right steering axis that extends in the up-and-down direction of the body frame 21; the left front wheel 31 that is located to the left of the right front wheel 32 in the left-and-right direction of the body frame 21 and that turns about the left steering axis that is parallel to the right steering axis; the right shock absorber 34 that supports the right front wheel 32 at the lower portion thereof and that absorbs the displacement of the right front wheel 32 towards the upper portion thereof in the up-and-down direction of the body frame 21; the left shock absorber 33 that supports the left front wheel 31 at the lower portion thereof and that absorbs the displacement of the left front wheel 31 towards the upper portion thereof in the up-and-down direction of the body frame 21; and the linkage 5 that supports the right front wheel 32 and the left front wheel 31 so as to be displaced relative to each other in the up-and-down direction of the body frame 21.

The linkage 5 includes the right side member 54 that supports the upper portion of the right shock absorber 34 so as to turn about the right steering axis; the left side member 53 that supports the upper portion of the left shock absorber 33 so as to turn about the left steering axis; the upper cross member 51 that supports the upper portion of the right side member 54 at the right end portion thereof so as to turn about the right upper axis that extends in the front-and-rear direction of the body frame 21, supports the upper portion of the left side member 53 at the left end portion thereof so as to turn about the left upper axis that is parallel to the right upper axis, and that is supported on the body frame 21 at the middle portion thereof so as to turn about the middle upper axis Mu that is parallel to the right upper axis and the left upper axis; and the lower cross member 52 that supports the lower portion of the right side member 54 at the right end portion thereof so as to turn about the right lower axis that is parallel to the right upper axis, supports the lower portion of the left side member 53 so as to turn about the left lower axis that is parallel to the left upper axis, and that is supported on the body frame 21 at the middle portion thereof so as to turn about the middle lower axis Md that is parallel to the middle upper axis Mu.

Figure 8:
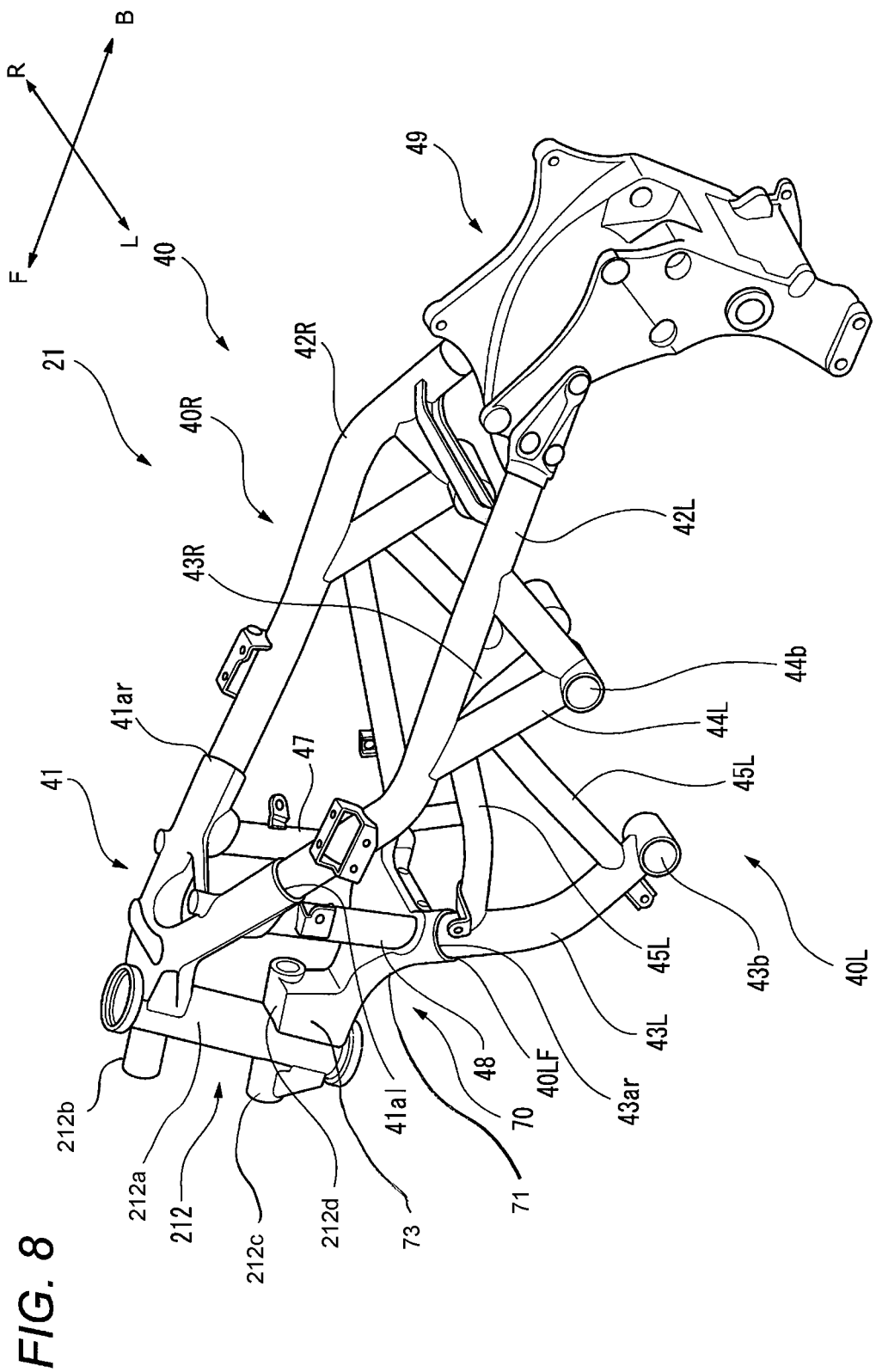
FIG. 8 is a perspective view of a body frame.

Next, the body frame 21 will be described in detail with reference to FIGS. 8 to 13. FIG. 8 is a perspective view of the body frame 21. As shown in FIG. 8, the body frame 21 includes a main frame 40, an upper bracket 41, a connecting bracket 70 and the link support 212. The main frame 40 extends in at least the front-and-rear direction of the vehicle 1.

The main frame 40 supports vehicle mounted components such as the engine 25 (refer to FIG. 1). The main frame 40 includes a right frame 40R and a left frame 40L that is located to the left of the right frame 40R. A front upper portion of the right frame 40R and a front upper portion of the left frame 40L are connected to an upper portion of the link support 212 via the upper bracket 41. A front lower portion of the right frame 40R and a front lower portion of the left frame 40L are connected to a lower portion of the link support 212 via the connecting bracket 70.

In this preferred embodiment, the right frame 40R and the left frame 40L each include a plurality of metallic pipes which are connected to one another. The right frame 40R extends in at least the front-and-rear direction of the vehicle 1. The right frame 40R supports right portions of the vehicle mounted components excluding the body frame 21. The left frame 40L is located to the left of the right frame 40R on the vehicle 1. The left frame 40L extends in at least the front-and-rear direction of the vehicle 1. The left frame 40L supports left portions of the vehicle mounted components excluding the body frame 21. In this preferred embodiment, the right frame 40R and the left frame 40L support the engine 25 (refer to FIG. 1) and a rear bracket 49 as the vehicle mounted components.

In this preferred embodiment, the right frame 40R is laterally symmetrical with that of the left frame 40L. Due to this, the left frame 40L will be described with reference to FIG. 8, and a description of the right frame 40R will be omitted here. For reference numerals of respective members of the right frame 40R, R is provided in place of L at the end of each of the reference numerals of respective members of the left frame 40L.

The left frame 40L includes a left upper frame 42L, a left lower frame 43L, a left engine support 44L and left vertical frames 45L. The left upper frame 42L and the left lower frame 43L extend in the front-and-rear direction of the vehicle 1. The left upper frame 42L and the left lower frame 43L are preferably pipe members. The left engine support 44L is located to the left upper frame 42L at a middle portion thereof in the front-and-rear direction of the vehicle 1.

The left engine support 44L is preferably formed by welding two pipe members to the left upper frame 42L, for example. A first left fastening hole 44b is provided in the left engine support 44L, so that a first fastening bolt that is fastened to a left portion of the engine 25 is inserted thereinto. A second left fastening hole 43b is provided at a rear end of the left lower frame 43L, so that a second fastening bolt that is fastened to the left portion of the engine 25 is inserted thereinto. The left portion of the engine 25 is supported on the left frame 40L by the first fastening bolt and the second fastening bolt.

The two left vertical frames 45L connect the left engine support 44L and the left lower frame 43L. The left vertical frames 45L are preferably pipe members. The left engine support 44L and upper portions of the left vertical frames 45L are connected together and the left lower frame 43L is connected to lower portion of the left vertical frames 45L.

The rear bracket 49 is connected to a rear end of the left upper frame 42L. The left frame 40L supports a left portion of the rear bracket 49. A rear suspension device that hangs the rear wheel 4 is attached to the rear bracket 49.

The upper bracket 41 connects a front portion of the right upper frame 42R and a front portion of the left upper frame 42L to the link support 212. The upper bracket 41 is a monolithic and unitary metallic member that is preferably made by casting, for example. The upper bracket 41 is welded to a rear surface of an upper portion of the link support 212. Two insertion holes 41ar, 41a1 are provided in a rear portion of the upper bracket 41 so as to open to the rear. The front portion of the right upper frame 42R and the front portion of the left upper frame 42L are welded to the upper bracket 41 while being inserted into the corresponding insertion holes 41ar, 41a1, respectively.

The link support 212 extends in the up-and-down direction of the body frame 21. The link support 212 is located ahead of a front end of the right frame 40R and a front end 40LF of the left frame 40L. In this preferred embodiment, a frontmost portion of a portion that is exposed to an exterior of the right lower frame 43R that is a pipe member is called the front end of the right frame 40R. A frontmost portion of a portion that is exposed to an exterior of the left lower frame 43R that is a pipe member is called the front end 40LF of the left frame 40L. The link support 212 is connected to the right upper frame 42R and the left upper frame 42L via the upper bracket 41. The link support 212 is connected to the right lower frame 43R and the left lower frame 43L via the connecting bracket 70.

Figure 9:
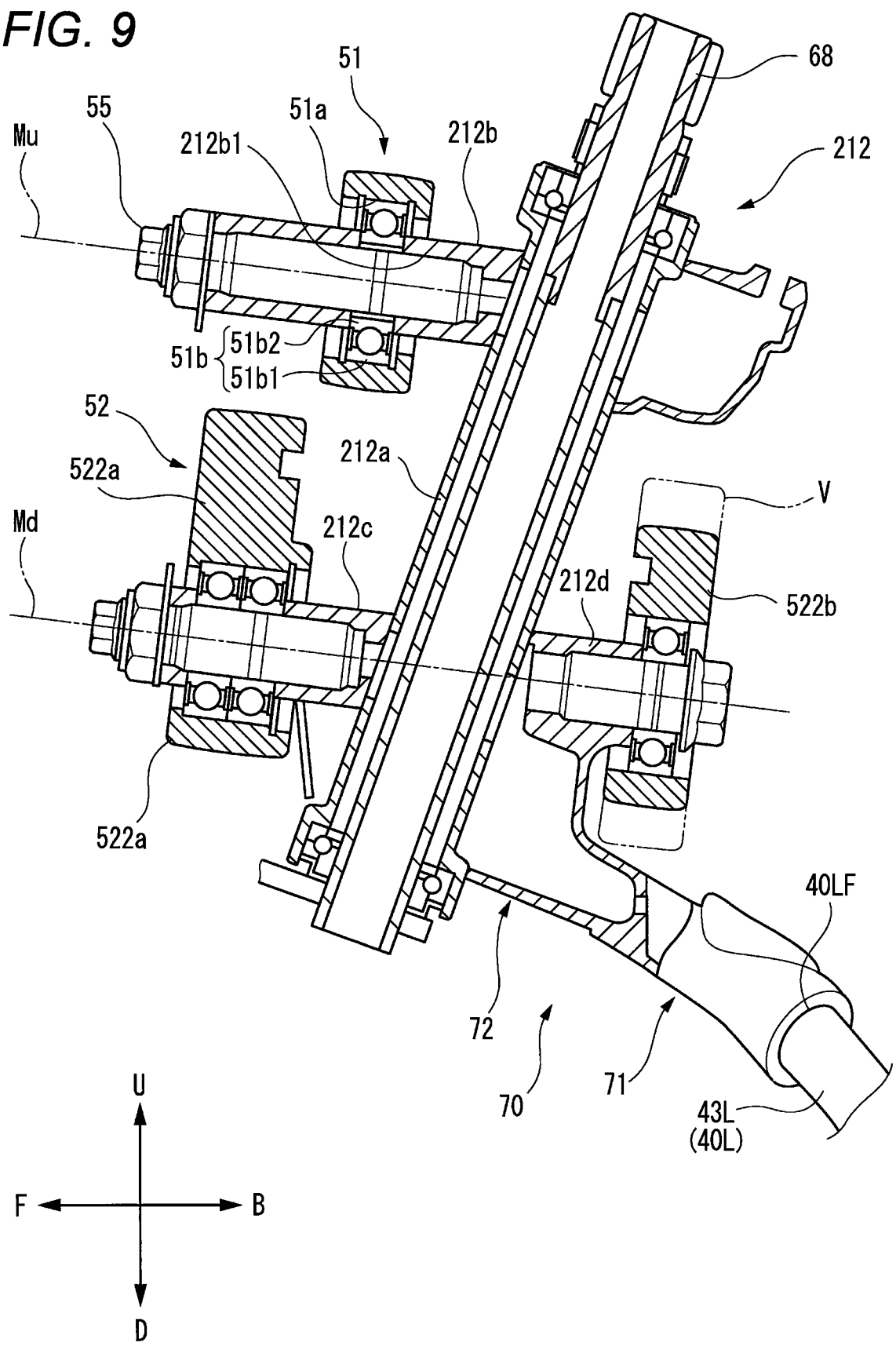
FIG. 9 is a sectional view of a link support.

FIG. 9 is a sectional view of the link support 212. As shown in FIG. 9, the link support 212 supports the middle portion of the upper cross member 51 and the middle portion of the lower cross member 52 so as to turn. The downstream side steering shaft 68 is inserted into an interior of a main pipe 212a. The link support 212 includes the main pipe 212a. An upper boss 212b, a lower front boss 212c and a lower rear boss 212d (an example of a turning support) are provided on the main pipe 212a.

The upper boss 212b is provided at a front portion of an upper portion of the link support 212. The upper boss 212b extends from a front surface of the link support 212 to the front in the front-and-rear direction of the body frame 21 along the middle upper axis Mu. The upper boss 212b is preferably a cylindrical metallic element. The upper boss 212b is welded to a front portion of an upper portion of the main pipe portion 212a.

A threaded hole is provided in the upper boss 212b, so that a fastening bolt 55 (an example of a shaft) that supports the upper cross member 51 so as to turn is inserted thereinto. A through hole 51a is provided in the middle portion of the upper cross member 51. A bearing 51b is provided in this through hole 51a. An outer ring 51b1 of the first bearing 51b is fixed to the upper cross member 51. The fastening bolt 55 is inserted into an inner ring 51b2 of the bearing 51b. The fastening bolt 55 is screwed into a threaded hole 212b1 of the upper boss 212b. A ring-shaped front surface of the upper boss 212b is in surface contact with a rear surface of the inner ring 51b2 of the bearing 51b. The inner ring 51b2 of the bearing 51b is pressed against the upper boss 212b by tightening the fastening bolt 55 to be fixed to the upper boss 212b. The upper cross member 51 turns relative to the upper boss 212b as a result of the inner ring 51b2 and the outer ring 51b1 of the bearing 51b turning relative to each other.

The lower front boss 212c is provided at a front portion of a lower portion of the link support 212. The lower front boss 212c extends from the front surface of the link support 212 to the front in the front-and-rear direction of the body frame 21 along the middle lower axis Md. The lower front boss 212c is preferably a cylindrical metallic member. The lower front boss 212c is welded to a front portion of a lower portion of the main pipe 212a. Similar to the upper boss 212b, the lower front boss 212c supports the lower front cross element 522a of the lower cross member 52 so as to turn.

The lower rear boss 212d (the example of the turning support) defines a portion of the connecting bracket 70. The lower rear boss 212d is welded to a rear portion of the lower portion of the link support 212. The lower rear boss 212d extends to the rear along the middle lower axis Md in the front-and-rear direction of the body frame 21. Similar to the upper boss 212b, the lower rear boss 212d supports the lower rear cross element 522b of the lower cross member 52 so as to turn.

Figure 10:
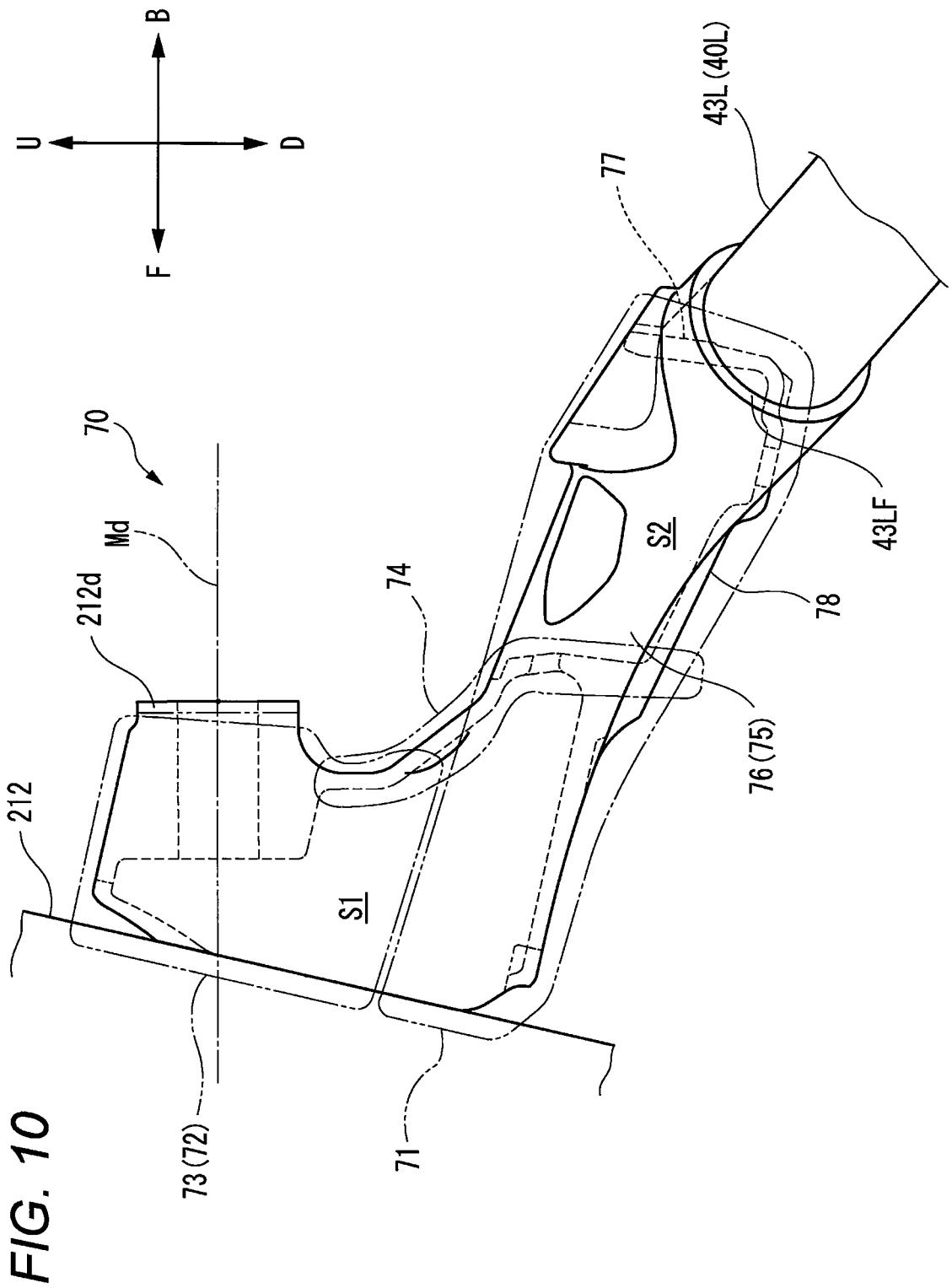
FIG. 10 is a side view of a connecting bracket.
Figure 11:
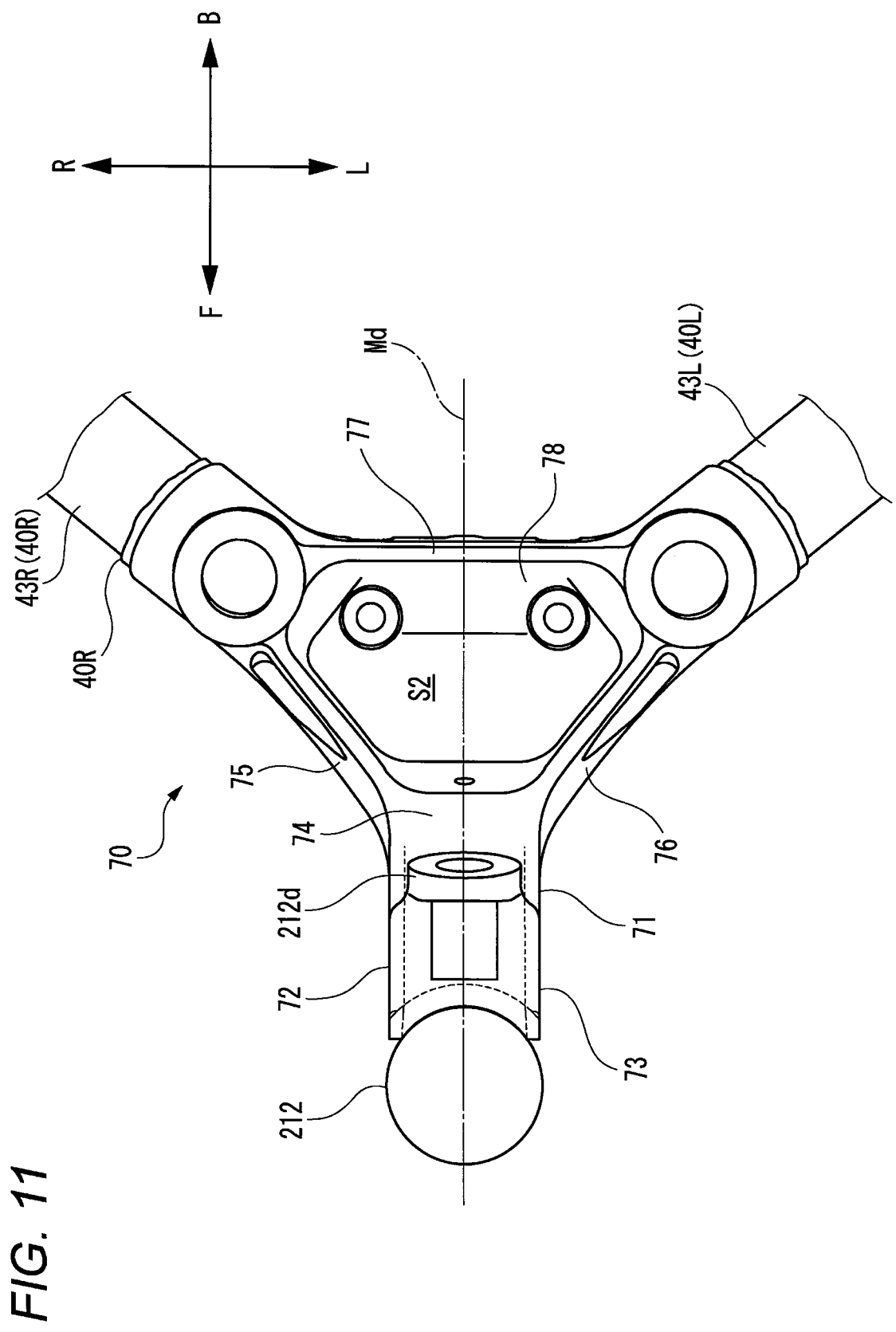
FIG. 11 is a top view of the connecting bracket.
Figure 12:
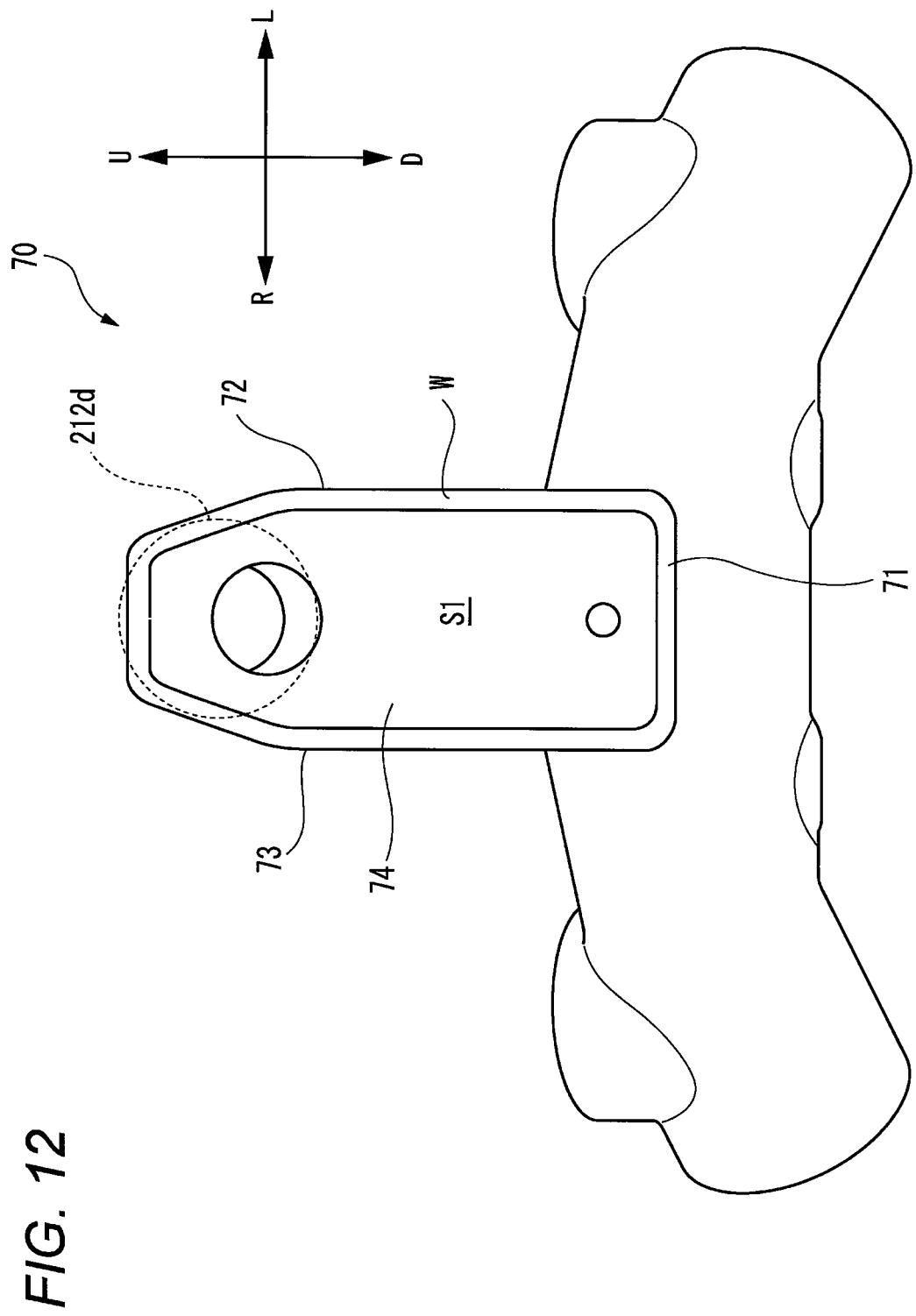
FIG. 12 is a front view of the connecting bracket.
Figure 13:
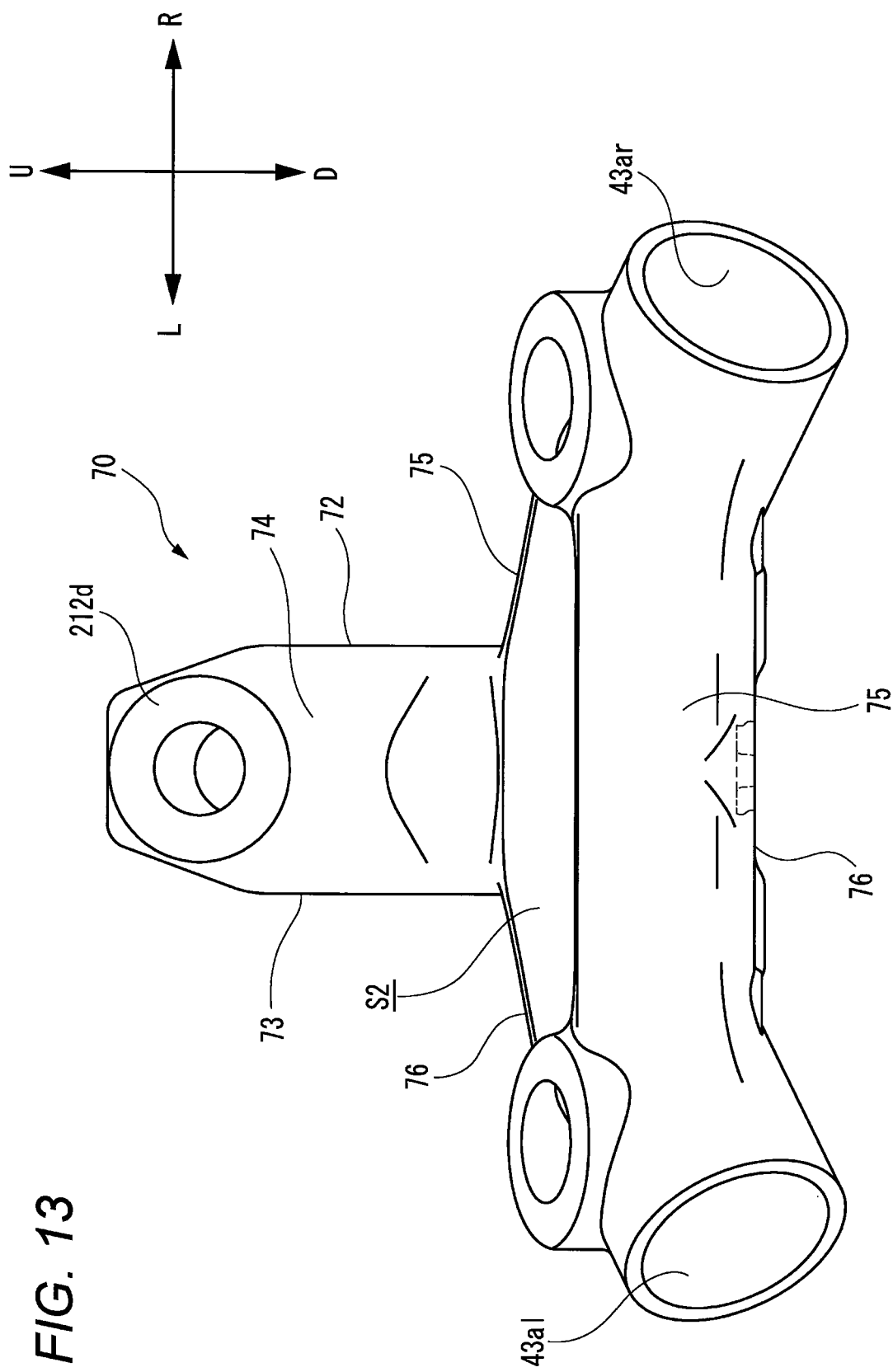
FIG. 13 is a rear view of the connecting bracket.

As shown in FIG. 8, the connecting bracket 70 connects the front portion of the right lower frame 43R and the front portion of the left lower frame 43L to the link support 212. The connecting bracket 70 is located below the upper bracket 41. The connecting bracket 70 will be described in detail with reference to FIGS. 10 to 13. FIG. 10 is a side view of the connecting bracket 70. FIG. 11 is a top view of the connecting bracket 70. FIG. 12 is a front view of the connecting bracket 70. FIG. 13 is a rear view of the connecting bracket 70.

As shown in FIGS. 10 and 11, the connecting bracket 70 includes the lower rear boss 212d, a connector 71, a right reinforcement wall 72 and a left reinforcement wall 73. The connector 71 connects the front portion of the right lower frame 43R and the front portion of the left lower frame 43L to the link support 212. At least a portion of the connector 71 is situated below the lower rear boss 212d in the up-and-down direction of the body frame 21. In this preferred embodiment, the connector 71 extends in the front-and-rear direction. A front end of the connector 71 is welded to a rear portion of the link support 212. A rear end of the connector 71 is welded to the front portion of the right lower frame 43R and the front portion of the left lower frame 43L.

As has been described above, the lower rear boss 212d supports the lower cross member 52 so as to turn about the middle lower axis Md. A front portion of the lower rear boss 212d is welded to the rear portion of the link support 212. A rear surface of the lower rear boss 212d is machined into a flat surface. A threaded hole opens in the rear surface, so that a fastening bolt that supports the lower cross member 52 so as to turn is inserted thereinto.

As shown in FIG. 10, the right reinforcement wall 72 extends in the up-and-down direction so as to connect the lower rear boss 212d and the connector 71. The left reinforcement wall 73 extends in the up-and-down direction so as to connect the lower rear boss 212d to the connector 71. As shown in FIG. 11, the right reinforcement wall 72 is connected to a right portion of the lower rear boss 212d. At least a portion of the right reinforcement wall 72 is located to the right of the middle lower axis Md of the lower rear boss 212d. The left reinforcement wall 73 is connected to a left portion of the lower rear boss 212d. At least a portion of the left reinforcement wall 73 is located to the left of the middle lower axis Md of the lower rear boss 212d.

The connecting bracket 70 is a monolithic and unitary element that is fabricated by methods including, for example, a lost wax or other casting process, a skiving process and the like. The connecting bracket 70 is a monolithic and unitary element including the lower rear boss 212d, the connector 71, the right reinforcement wall 72 and the left reinforcement wall 73. When referred to here, the monolithic and unitary element means an element in which the lower rear boss 212d, the connector 71, the right reinforcement wall 72 and the left reinforcement wall 73 are formed continuously of a common material. When referred to here, the monolithic and unitary element does not include a configuration in which the lower rear boss 212d, the connector 71, the right reinforcement wall 72 and the left reinforcement wall 73 are fabricated as separate elements which are then connected together in an integrated fashion with connectors, such as screws.

The connecting bracket 70 may be fabricated through casting, for example. For example, molten metal is poured into a mold. This substantially fabricates the connecting bracket 70. After the connecting bracket 70 has been fabricated in this way, the rear surface of the lower rear boss 212d which requires a particularly accurate machining precision is machined to be cut, thus making it possible to obtain the connecting bracket 70. The connecting bracket 70 may be fabricated of, for example, cast iron, aluminum alloy, magnesium alloy and the like. The connecting bracket 70 may be fabricated only through casting with a mold, for example.

Alternatively, when a connecting bracket 70 of a complex shape is fabricated, the lost wax process or the like may be used. Additionally, the connecting bracket 70 may be fabricated only through cutting without using the casting process.

According to a preferred embodiment of the vehicle 1, the lower rear boss 212d includes the connecting bracket 70 that is monolithic and unitary with the connector 71 that is connected with the right lower frame 43R and the left lower frame 43L. Due to this, a portion of the torsional moment inputted into the lower rear boss 212d is transmitted to the right lower frame 43R and the left lower frame 43L by way of the connecting bracket 70. Namely, the torsional moment that is transmitted from the lower rear boss 212d to the link support 212 is reduced. This reduces stress that is inputted into the weld between the link support 212 and the lower rear boss 212d.

Further, the lower rear boss 212d, the connector 71, the right reinforcement wall 72 and the left reinforcement wall 73 are a single monolithic and unitary element. This allows torsional moment that is inputted into the lower rear boss 212d to be dispersed to the weld between the lower rear boss 212d and the link support 212 and also to the right reinforcement wall 72 and the left reinforcement wall 73 that are located to the right and left of the lower rear boss 212d, respectively, to be eventually transmitted to the link support 212. This reduces stress that is concentrated on the weld between the lower rear boss 212d and the link support 212.

The stress concentrated on the weld between the lower rear boss 212d and the link support 212 is reduced for the reasons described above, and therefore, it is easier to provide a sufficient connecting strength between the lower rear boss and the link support without using the large diameter link support in which the lower rear boss has the shape of a frustum of circular cone as in Catalogo parti di ricambio, MP3 300 ie LT Mod. ZAPM64102, Piaggio. This makes it difficult for the link support 212 to be enlarged in diameter, thus preventing an enlargement in the size of the vehicle 1. It should be noted that a lower rear boss having the shape of a frustum of circular cone like the one in Catalogo parti di ricambio, MP3 300 ie LT Mod. ZAPM64102, Piaggio may be used for the lower rear boss 212d in the vehicle 1 of this preferred embodiment.

According to a preferred embodiment of the vehicle 1, the lower rear boss 212d supports the lower cross member 52 so as to turn as shown in FIG. 8. The right reinforcement wall 72 and the left reinforcement wall 73 connect the connector 71 located below the lower rear boss 212d and the lower rear boss 212d together.

In many occasions, a torsional force inputted into the lower cross member 52 is greater than a torsional force inputted into the upper cross member 51. Although a large torsional force is inputted from the lower cross member 52 to the link support 212, the vehicle 1 of this preferred embodiment reduces stress that is inputted into the weld between the link support 212 and the lower rear boss 212d. This prevents an enlargement in the diameter of the lower portion of the link support 212, thus making it possible to prevent an enlargement in the size of the vehicle 1.

According to a preferred embodiment of the vehicle 1, the rear portion of the right reinforcement wall 72 and the rear portion of the left reinforcement wall 73 are connected at the rear reinforcement wall 74 as shown in FIGS. 11 and 13. An upper end of the rear reinforcement wall 74 is connected to the lower rear boss 212d. The rear reinforcement wall 74 is also connected to the connector 71. This rear reinforcement wall 74 also defines a portion of the monolithic and unitary connecting bracket 70. The connection of the rear portion of the right reinforcement wall 72 and the rear portion of the left reinforcement wall 73 by the rear reinforcement wall 74 enhances the strength of the connecting bracket 70.

According to a preferred embodiment of the vehicle 1, the rear reinforcement wall 74 is monolithic and unitary with the connecting bracket 70. The rear reinforcement wall 74 defines a portion of the connecting bracket 70. As shown in FIGS. 10 and 12, a first space S1 that opens forward is defined by the lower rear boss 212d, the right reinforcement wall 72, the left reinforcement wall 73, the rear reinforcement wall 74 and the connector 71. A weld W between the connecting bracket 70 and the link support 212 surrounds the first space S1 as shown in FIG. 12 so that the opening of the first space S1 is closed by the link support 212.

According to a preferred embodiment of the vehicle 1, providing the first space S1 in the connecting bracket 70 reduces the weight thereof. In addition, providing the weld W so as to surround the opening of the first space S1 provides a large welding area, thus making it easy to enhance the welding strength between the connecting bracket 70 and the link support 212.

According to a preferred embodiment of the vehicle 1, the lower cross member 52 includes the lower front cross element 522a located ahead of the link support 212 and the lower rear cross element 522b located behind the link support 212 and connected to the lower front cross element 522a as shown in FIG. 9. The lower rear boss 212d supports the lower rear cross element 522b so as to turn about the middle lower axis Md.

In many occasions, a torsional force inputted into the lower cross member 52 is greater than a torsional force inputted into the upper cross member 51. Although a large torsional force is inputted from the lower cross member 52 to the link support 212, the vehicle 1 of this preferred embodiment reduces stress that is inputted into the weld between the link support 212 and the lower rear boss 212d. This prevents an enlargement in the diameter of the lower portion of the link support 212, thus making it possible to prevent an enlargement in the size of the vehicle 1.

According to a preferred embodiment of the vehicle 1, the main frame 40 includes the right frame 40R that extends in at least the front-and-rear direction of the vehicle 1 and the left frame 40L that extends in at least the front-and-rear direction of the vehicle 1 and located to the left of the right frame 40R in the left-and-right direction of the vehicle 1.

In this preferred embodiment, as shown in FIG. 11, the right reinforcement wall 72 is located to the left of the front end of the right frame 40R in the left-and-right direction of the vehicle 1. The left reinforcement wall 73 is located to the right of the front end of the left frame 40L in the left-and-right direction of the vehicle 1.

It is more difficult for an element that is disposed near the upper cross member 51 to interfere with the upper cross member 51 as the element is disposed closer to the turning center of the upper cross member 51. It is more difficult for an element that is disposed near the lower cross member 52 to interfere with the lower cross member 52 as the element is disposed closer to the turning center of the lower cross member 52. The right reinforcement wall 72 that is located closer to the upper cross member 51 and the lower cross member 52 than the front end of the right frame 40R in the front-and-rear direction of the body frame 21 is located to the left of the front end of the right frame 40R. The left reinforcement wall 73 that is located closer to the upper cross member 51 and the lower cross member 52 than the front end of the left frame 40L in the front-and-rear direction of the body frame 21 is located to the right of the front end of the left frame 40L. According to a preferred embodiment of the vehicle 1, the right reinforcement wall 72 and the left reinforcement wall 73 are located near the upper cross member 51 and the lower cross member 52 while avoiding interference with the upper cross member 51 and the lower cross member 52, thus making it easy to prevent an enlargement in the size of the vehicle 1.

According to a preferred embodiment of the vehicle 1, the rear portion of the right reinforcement wall 72 and the rear portion of the left reinforcement wall 73 are connected at the rear reinforcement wall 74. As shown in FIGS. 10, 11 and 13, the connector 71 includes a right wall 75 that connects the front portion of the right frame 40R and the right reinforcement wall 72, a left wall 76 that connects the front portion of the left frame 40L and the left reinforcement wall 73, a rear wall 77 that connects the front portion of the right frame 40R and the front portion of the left frame 40L, and a lower wall 78 that connects a lower portion of the right wall 75, a lower portion of the left wall 76, and a lower portion of the rear wall 77 together. A second space S2 that opens upwards is defined by the rear reinforcement wall 74, the right wall 75, the left wall 76, the rear wall 77 and the lower wall 78. It should be noted that the connector 71 may include an upper wall that connects an upper portion of the right wall 75, an upper portion of the left wall 76, and an upper portion of the rear wall 77 together in place of the lower wall 78. As this occurs, a second space S2 that opens downwards is defined by the rear reinforcement wall 74, the right wall 75, the left wall 76, the rear wall 77 and the upper wall.

According to a preferred embodiment of the vehicle 1, providing the second space S2 in the connecting bracket 70 reduces the weight thereof.

According to a preferred embodiment of the vehicle 1, as shown in FIG. 11, a front portion of the right wall 75 is located to the left of a rear portion thereof and a front portion of the left wall 76 is located to the right of a rear portion thereof, when the vehicle 1 is seen from above.

According to a preferred embodiment of the vehicle 1, the right reinforcement wall 72 and the left reinforcement wall 73 are located near the upper cross member 51 or the lower cross member 52 while avoiding interference with the upper cross member 51 or the lower cross member 52, thus making it easy to prevent an enlargement in the size of the vehicle 1.

According to a preferred embodiment of the vehicle 1, as shown in FIG. 8, the right frame 40R includes the right upper frame 42R that extends in at least the front-and-rear direction of the vehicle 1 and the right lower frame 43R that is located below the right upper frame 42R and that extends in at least the front-and-rear direction of the vehicle 1. The left frame 40L includes the left upper frame 42L that extends in at least the front-and-rear direction of the vehicle 1 and the left lower frame 43L that is located below the left upper frame 42L and that extends in at least the front-and-rear direction of the vehicle 1. The front portion of the right upper frame 42R and the front portion of the left upper frame 42L are connected to the upper portion of the link support 212 by way of the upper bracket 41.

The upper bracket 41 includes the right upper insertion hole 41ar into which the front portion of the right upper frame 42R is inserted and the left upper insertion hole 41a1 into which the front portion of the left upper frame 42L is inserted. As shown in FIG. 13, the connecting bracket 70 includes a right lower insertion hole 70ar into which the front portion of the right lower frame 43R is inserted and a left lower insertion hole 70a1 into which the front portion of the left lower frame 43L is inserted. As shown in FIG. 8, the upper bracket 41 and the connecting bracket 70 are connected together by a right vertical connecting frame 47 that extends in the up-and-down direction of the body frame 21 and a left vertical connecting frame 48 that extends in the up-and-down direction of the body frame 21 and that is located to the left of the right vertical connecting frame 47.

According to a preferred embodiment of the vehicle 1, the connecting strength of the upper bracket 41 and the connecting bracket 70 is enhanced by the right vertical connecting frame 47 and the left vertical connecting frame 48, thus making it easy to fix relative positions thereof to the right upper insertion hole 41ar, the left upper insertion hole 41a1, the right lower insertion hole 70ar and the left lower insertion hole 70a1. This enhances the working efficiency in inserting the respective front portions of the frames into the corresponding insertion holes.

Frames extending in the up-and-down direction such as the right vertical connecting frame 47 and the left vertical connecting frame 48 that are provided directly behind the link support 212 preferably bear a torsional force that is inputted into the link support. The inventor has studied in detail the mechanism of torsional deformation of the link support 212 generated when different forces are inputted into the right front wheel and the left front wheel as will be described below and discovered that the right vertical connecting frame 47 and the left vertical connecting frame 48 are preferable to prevent the torsional deformation of the link support 212.

The following phenomenon is generated sometimes while riding on the vehicle 1 for the reason that the vehicle 1 rides over a step obliquely or the left and right front wheels pass road surfaces having a different frictional coefficient μ when the brake is applied. For example, a greater resisting force is exerted to the right front wheel 32 than to the left front wheel 31, a clockwise force is exerted on the lower cross member 52 of the linkage 5 when seen from above, while a counterclockwise force is exerted on the upper cross member 51 when seen from above. The link support 212 supports the upper cross member 51 at the upper portion and supports the lower cross member 52 at the lower portion thereof. Due to this, a clockwise force is exerted on the lower portion of the link support 212 when seen from above and a counterclockwise force is exerted on the upper portion of the link support 212 when seen from above. Then, a counterclockwise force acting about an axis of the link support 212 when seen from above is exerted to the right upper frame 42R of the main frame 40 that is connected to the rear portion of the link support 212, while a clockwise force acting about the axis of the link support 212 when seen from above is exerted to the right lower frame 43R. The counterclockwise force acting about the axis of the link support 212 when seen from above is exerted to the left upper frame 42L, while the clockwise force acting about the axis of the link support 212 when seen from above is exerted to the left lower frame 43L. As this occurs, the main frame 40 deforms so that points situated away from the link support 212 move away from each other when seen from above. For example, the rear portion of the right upper frame 42R is displaced rightwards, while the rear portion of the right lower frame 43R is displaced leftwards. Similarly, for example, the rear portion of the left upper frame 42L is displaced rightwards, while the rear portion of the left lower frame 43L is displaced leftwards. When the main frame 40 deforms in this way, a torsional deformation is generated in the link support 212. The greater the displacement amount of the main frame 40, the greater the torsional deformation amount of the link support 212. The inventor has discovered that preventing the displacement amount of the main frame 40 significantly reduces or prevents the torsional displacement amount of the link support 212.

Then, in this preferred embodiment, the right vertical connecting frame 47 prevents a relative displacement between the right upper frame 42R and the right lower frame 43r of the main frame 40. The left vertical connecting frame 48 prevents a relative displacement between the left upper frame 42L and the left lower frame 43L of the main frame 40.

Further, the right vertical connecting frame 47 is connected to the upper bracket 41 and the connecting bracket 70 that connect the front portion of the right upper frame 42R and the front portion of the right lower frame 43R in a location behind the linkage 5. Namely, the right vertical connecting frame 47 is provided in the location relatively near the link support 212 behind the linkage 5. Similarly, the left vertical connecting frame 48 is connected to the upper bracket 41 and the connecting bracket 70 that connect the front portion of the left upper frame 42L and the front portion of the left lower frame 43L in a location behind the linkage 5. Namely, the left vertical connecting frame 48 is provided in the location relatively near the link support 212 behind the linkage 5.

The right vertical connecting frame 47 and the left vertical connecting frame 48 that prevent the deformation of the main frame 40 are provided in locations near the link support 212 that define an original point from which the deformation of the main frame 40 originates. This enables the right vertical connecting frame 47 and the left vertical connecting frame 48 to prevent the torsional deformation of the link support 212 effectively.

To significantly reduce or prevent the torsional deformation of the link support 212, the following constructions (1) to (3) may be used alone or in combination in place of the above right vertical connecting frame 47 and left vertical connecting frame 48. According to the following constructions (1) to (3), the deformation of the main frame 40 described above is also significantly reduced or prevented. (1) A connecting frame located behind the linkage 5 connects the right upper frame 42R and the left lower frame 43L together. The deformation of the main frame 40 described above is prevented by preventing a relative displacement between the right upper frame 42R and the left lower frame 43L. (2) A connecting frame located behind the linkage 5 connects the left upper frame 42L and the right lower frame 43R together. The deformation of the main frame 40 described above is prevented by preventing a relative displacement between the left upper frame 42L and the right lower frame 43R. (3) A frame located behind the linkage 5 connects the right upper frame 42R and the right lower frame 43R together and the left upper frame 42L and the left lower frame 43L together. The deformation of the main frame 40 described above is prevented by preventing a relative displacement between the right upper frame 42R and the right lower frame 43R and a relative displacement between the left upper frame 42L and the left lower frame 43L.

In the preferred embodiments described above, the connecting bracket 70 is described as being welded to the cylindrical link support. However, the present invention is not limited to this configuration. For example, the portion defined by the link support and lying below the lower front boss and the lower rear boss may be part of the connecting bracket 70.

In the preferred embodiments described above, the lower rear boss 212d is described as being the turning support. However, the present invention is not limited to this structure. The turning support is connected to the link support 212 and supports at least one of the upper cross member 51 and the lower cross member 52 so as to turn about the middle upper axis Mu or the middle lower axis Md. For example, one end portion of the shaft member may be fixed to the lower cross member 52 and the inner ring of the bearing may be fixed to the other end portion of the shaft member. As this occurs, the turning support includes a hole portion into which the outer ring of the bearing is inserted.

In the preferred embodiments described above, the turning support 212d is described as supporting the lower cross member 52. However, the present invention is not limited to this structure. The turning support may be the upper boss 212b that supports the upper cross member 51 so as to turn about the middle upper axis Mu.

In the preferred embodiments described above, the connector 71 is described as being located below the lower rear boss 212d. However, the present invention is not limited to this structure. A structure may be used in which the connector is located above the lower rear boss 212d. Alternatively, with the turning support being the upper boss 212b, the turning support may be located above the upper boss 212b or the turning support may be located below the upper boss 212b.

In the preferred embodiments described above, the vehicle 1 is described as having the body frame including the right frame and the left frame, however, the present invention is not limited to this structure. For example, the vehicle may be a scooter having a body frame including a down tube that passes through a lateral center of the vehicle 1. The preferred embodiments of the present invention may be applied to both a vehicle having a scooter body frame and a vehicle having a rigid engine body frame.

In the preferred embodiments described above, the right frame 40R and the left frame 40L are described as supporting the engine 25 and the rear bracket 49 as vehicle mounted components. However, the present invention is not limited to this structure. For example, the right frame 40R and the left frame 40L may support a pivot arm link of a swing unit for the rear wheel, a fuel tank, a suspension device that supports the rear wheel and the like as vehicle mounted components.

In the preferred embodiments described above, the upper cross member 51 includes the upper front cross element that is disposed ahead of the link support 212 but does not include a cross element that is disposed behind the link support 212. The lower cross member 52 includes the lower front cross element that is disposed ahead of the link support 212 and the lower rear cross element that is disposed behind the link support 212. However, the present invention is not limited to this structure. The upper cross member 51 may have the upper front cross element disposed ahead of the link support 212 and a cross element disposed behind the link support 212, and the lower cross member 52 may have the lower front cross element disposed ahead of the link support 212 and the lower rear cross element disposed behind the link support 212. Alternatively, the upper cross member 51 may include a single cross element disposed ahead of or behind the link support 212, and the lower cross member 52 may include a single cross element disposed ahead of or behind the link support 212.

In the preferred embodiments described above, the left shock absorber 33 and the right shock absorber 34 each preferably include the pair of telescopic elements. However, depending upon the specifications of the vehicle 1, the number of telescopic elements that the left shock absorber 33 and the right shock absorber 34 include individually may be one.

In the preferred embodiments described above, in the left shock absorber 33, the left outer tube is described as being situated above the left inner tube and the left front wheel 31 is described as being supported rotatably at the lower portion of the left inner tube, and in the right shock absorber 34, the right outer tube is described as being situated above the right inner tube and the right front wheel 32 is described as being supported rotatably at the lower portion of the right inner tube. However, the present invention is not limited to this structure. In the left shock absorber, the left inner tube may be situated above the left outer tube and the left front wheel may be supported rotatably at the lower portion of the left outer tube, and in the right shock absorber, the right inner tube may be situated above the right outer tube and the right front wheel may be supported rotatably at the lower portion of the right outer tube.

In the preferred embodiments described above, while the left shock absorber 33 is described as being located to the left side of the left front wheel 31, and the right shock absorber 34 is described as being located to the right side of the right front wheel 32, the present invention is not limited to this structure. The left shock absorber 33 may be situated to the right of the left front wheel 31, and the right shock absorber 34 may be situated to the left of the right front wheel 32.

In the preferred embodiments described above, while the engine 25 is described as supporting the rear wheel 4 so as to oscillate, the present invention is not limited thereto. The engine and the rear wheel may be both supported on the body frame so as to oscillate.

In the preferred embodiments described above, the vehicle 1 includes the single rear wheel 4. However, there may be a plurality of rear wheels.

In the preferred embodiments described above, the center of the rear wheel 4 in relation to the left-and-right direction of the body frame 21 coincides with the center of the distance defined between the left front wheel 31 and the right front wheel 32 in relation to the left-and-right direction of the body frame 21. Although the structures described above is preferable, the center of the rear wheel 4 in relation to the left-and-right direction of the body frame 21 may not coincide with the center of the distance defined between the left front wheel 31 and the right front wheel 32 in relation to the left-and-right direction of the body frame 21.

In the preferred embodiments described above, the linkage 5 includes the upper cross member 51 and the lower cross member 52. However, the linkage 5 may include a cross member other than the upper cross member 51 and the lower cross member 52. The "upper cross member" and the "lower cross member" are merely so called based on their relative positional relationship in the up-and-down direction. The upper cross member is not intended to imply an uppermost cross member in the linkage 5. The upper cross member includes a cross member that is located above a cross member that is located therebelow. The lower cross member is not intended to imply a lowermost cross member in the linkage 5. The lower cross member includes a cross member that is located below another cross member that is located thereabove. At least one of the upper cross member 51 and the lower cross member 52 may include two members of a right cross member and a left cross member. In this way, the upper cross member 51 and the lower cross member 52 may include a plurality of cross members as long as they maintain the link function.

In the preferred embodiments described above, the linkage 5 defines up the parallel four joint link system. However, the linkage 5 may use a configuration such as a double wishbone link system.

When the word of "parallel" is used in this description, it means that "parallel" also includes two straight lines which do not intersect each other as members while they are inclined within an angular range of about ±40 degrees. When "along" is used in relation to a direction or a member in this specification, it means that a case is also included where the direction or the member is inclined within an angular range of about ±40 degrees. When the expression reading "something extends in a certain direction" is used in this specification, it means that a case is also included where something extends in the certain direction while being inclined within an angular range of about ±40 degrees with respect to the certain direction.

The terms and expressions that are used in this specification are used to describe the preferred embodiments of the present invention and hence should not be construed as limiting the scope of the present invention. It should be understood that any equivalents to the characteristic matters that are shown and described in this specification should not be excluded and that various modifications made within the scope of claims to be made later are permitted.

The present invention can be embodied in many different forms. This specification should be regarded as providing just the preferred embodiments of the principle of the present invention. The preferred embodiments that are at least described or illustrated in this specification are so described or illustrated based on the understanding that the preferred embodiments are not intended to limit the present invention.

The present invention also includes all possible preferred embodiments including an equivalent element, a modification, a deletion, a combination (for example, a combination of characteristics that are shared commonly by various preferred embodiments), an improvement and an alteration that those skilled in the art to which the present invention pertains can recognize based on the preferred embodiments disclosed in this specification. The limitative matters of claims should be construed broadly based on terms used in the claims and hence should not be limited by the preferred embodiments described in this specification or the prosecution of this patent application. The preferred embodiments should be construed to be non-exclusive. For example, when used in this specification, the terms "preferable or preferably" and "may" should be construed as being non-exclusive, and hence, those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame that leans to the right when the vehicle turns to the right and leans to the left when the vehicle turns to the left;
   a right front wheel that turns about a right steering axis that extends in an up-and-down direction of the body frame;
   a left front wheel located to the left of the right front wheel in a left-and-right direction of the body frame and that turns about a left steering axis that is parallel to the right steering axis;
   a right shock absorber supporting the right front wheel at a lower portion thereof and that absorbs a displacement of the right front wheel towards an upper portion thereof in the up-and-down direction of the body frame;
   a left shock absorber supporting the left front wheel at a lower portion thereof and that absorbs a displacement of the left front wheel towards an upper portion thereof in the up-and-down direction of the body frame; and
   a linkage supporting the right front wheel and the left front wheel so that the right front wheel and the left front wheel are displaced relative to each other in the up-and-down direction of the body frame; wherein
   the linkage includes:
      a right side member supporting an upper portion of the right shock absorber so as to turn about the right steering axis;
      a left side member supporting an upper portion of the left shock absorber so as to turn about the left steering axis;
      an upper cross member supporting an upper portion of the right side member at a right end portion thereof so as to turn about a right upper axis that extends in a front-and-rear direction of the body frame, supporting an upper portion of the left side member at a left end portion thereof so as to turn about a left upper axis that is parallel to the right upper axis, and supported on the body frame at a middle portion thereof so as to turn about a middle upper axis that is parallel to the right upper axis and the left upper axis; and
      a lower cross member supporting a lower portion of the right side member at a right end portion thereof so as to turn about a right lower axis that is parallel to the right upper axis, supporting a lower portion of the left side member at a left end portion thereof so as to turn about a left lower axis that is parallel to the left upper axis, and supported on the body frame at a middle portion thereof so as to turn about a middle lower axis that is parallel to the middle upper axis;
   the body frame includes:
      a main frame extending in at least a front-and-rear direction of the vehicle to support a component that is to be mounted on the vehicle;
      a link support located ahead of the main frame in relation to the front-and-rear direction of the vehicle to support the upper cross member and the lower cross member so as to turn; and
      a connecting bracket that connects a front portion of the main frame and the link support;
   the connecting bracket includes:
      a turning support connected to the link support to support at least one of the upper cross member and the lower cross member so as to turn about the middle upper axis or the middle lower axis;
      a connector that connects the front portion of the main frame and the link support by at least a portion thereof above or below the turning support in the up-and-down direction of the body frame; and
      a right reinforcement wall and a left reinforcement wall located to the right and left of a center axis of the turning support, respectively, at least portions thereof in the left-and-right direction of the body frame and extend in the up-and-down direction so as to connect the turning support and the connector together; and the connecting bracket including the turning support, the connector, the right reinforcement wall, and the left reinforcement wall are monolithic and unitary.

2. The vehicle according to claim 1, wherein the turning support supports the lower cross member so as to turn; and the right reinforcement wall and the left reinforcement wall connect the connector that is located below the turning support to the turning support.

3. The vehicle according to claim 1, wherein a rear portion of the right reinforcement wall and a rear portion of the left reinforcement wall are connected together at a rear reinforcement wall.

4. The vehicle according to claim 3, wherein the rear reinforcement wall is monolithic and unitary with the connecting bracket;

a first space that opens forwards is defined by the turning support, the right reinforcement wall, the left reinforcement wall, the rear reinforcement wall, and the connector; and a weld between the connecting bracket and the link support surrounds an opening of the first space in such a way that the opening of the first space is closed by the link support.

5. The vehicle according to claim 1, wherein the lower cross member includes a lower front cross element located ahead of the link support and a lower rear cross element located behind the link support and connected to the lower front cross element; and the turning support supports the lower rear cross element so as to turn about the middle lower axis.

6. The vehicle according to claim 1, wherein the main frame includes:

a right frame extending in at least the front-and-rear of the vehicle; and a left frame extending in at least the front-and-rear direction of the vehicle and located to the left of the right frame in a left-and-right direction of the vehicle; wherein the right reinforcement wall is located to the left of a front end of the right frame in the left-and-right direction of the vehicle; and the left reinforcement wall is located to the right of a front end of the left frame in the left-and-right direction of the vehicle.

7. The vehicle according to claim 6, wherein the rear portion of the right reinforcement wall and the rear portion of the left reinforcement wall are connected by the rear reinforcement wall;

the connector includes:

a right wall connecting a front portion of the right frame and the right reinforcement wall;

a left wall connecting a front portion of the left frame and the left reinforcement wall;

a rear wall connecting the front portion of the right frame and the front portion of the left frame; and a lower wall connecting a lower portion of the right wall, a lower portion of the left wall, and a lower portion of the rear wall, or an upper wall connecting an upper portion of the right wall, an upper portion of the left wall, and an upper portion of the rear wall; and a second space that opens upwards or downwards is defined by the rear reinforcement wall, the right wall, the left wall, the rear wall, and the lower wall or the upper wall.

8. The vehicle according to claim 7, wherein a front portion of the right wall is located to the left of a rear portion thereof, and a front portion of the left wall is located to the right of a rear portion thereof when the vehicle is seen from above.

9. The vehicle according to claim 6, wherein the right frame includes:

a right upper frame extending in at least the front-and-rear direction of the vehicle; and a right lower frame located below the right upper frame and extending in the front-and-rear direction of the vehicle;

the left frame includes:

a left upper frame extending in at least the front-and-rear direction of the vehicle; and a left lower frame located below the left upper frame and extending in the front-and-rear direction of the vehicle;

a front portion of the right upper frame and a front portion of the left upper frame are connected to an upper portion of the link support via an upper bracket;

the upper bracket includes a right upper insertion hole into which the front portion of the right upper frame extends and a left upper insertion hole into which a front portion of the left upper frame extends;

the connecting bracket includes a right lower insertion hole into which a front portion of the right lower frame extends and a left lower insertion hole into which a front portion of the left lower frame extends; and the upper bracket and the connecting bracket are connected by a right vertical connecting frame extending in the up-and-down direction of the body frame and a left vertical connecting frame extending in the up-and-down direction of the body frame and located to the left of the right vertical connecting frame.

* * * * *